(12) United States Patent
Shirakawa et al.

(10) Patent No.: US 12,516,961 B2
(45) Date of Patent: *Jan. 6, 2026

(54) POSITION DETECTION DEVICE AND VEHICLE STEERING DEVICE

(71) Applicant: Proterial, Ltd., Tokyo (JP)

(72) Inventors: Yohei Shirakawa, Tokyo (JP); Yoshiaki Yanagisawa, Tokyo (JP)

(73) Assignee: Proterial, Ltd., Tokyo (JP)

(*) Notice: Subject to any disclaimer, the term of this patent is extended or adjusted under 35 U.S.C. 154(b) by 190 days.

This patent is subject to a terminal disclaimer.

(21) Appl. No.: 18/470,203

(22) Filed: Sep. 19, 2023

(65) Prior Publication Data

US 2024/0110815 A1 Apr. 4, 2024

(30) Foreign Application Priority Data

Sep. 27, 2022 (JP) ................. 2022-153741

(51) Int. Cl.
*G01D 5/20* (2006.01)
*B62D 15/02* (2006.01)

(52) U.S. Cl.
CPC ........... *G01D 5/20* (2013.01); *B62D 15/0225* (2013.01)

(58) Field of Classification Search
CPC .............................. G01D 5/20; B62D 15/0225
See application file for complete search history.

(56) References Cited

U.S. PATENT DOCUMENTS

| | | | |
|---|---|---|---|
| 2010/0179727 A1* | 7/2010 | Luthje | G01D 5/2492 701/41 |
| 2021/0094610 A1* | 4/2021 | Yamaguchi | B62D 5/0469 |
| 2024/0077334 A1* | 3/2024 | Shirakawa | B62D 15/0225 |
| 2024/0094031 A1* | 3/2024 | Shirakawa | B62D 15/0225 |

FOREIGN PATENT DOCUMENTS

JP 2014-098655 A 5/2014

* cited by examiner

*Primary Examiner* — Akm Zakaria
(74) *Attorney, Agent, or Firm* — Studebaker Brackett PLLC

(57) ABSTRACT

A position detection device is configured to detect a position of a moving member moving backward and forward in a predetermined moving direction. The position detection device is provided with a conductive detection member attached to the moving member, and an exciting coil and a detection coil that are arranged extending in the moving direction of the moving member and facing the conductive detection member. The conductive detection member includes a recessed portion recessed in a direction away from the exciting coil and the detection coil. A voltage is induced in the detection coil by a current flowing in the conductive detection member due to a magnetic field generated by the exciting coil, and a magnitude of the voltage induced in the detection coil varies with a position of the recessed portion relative to the detection coil. A vehicle steering device is provided with a shaft, a housing, and the position detection device.

10 Claims, 14 Drawing Sheets

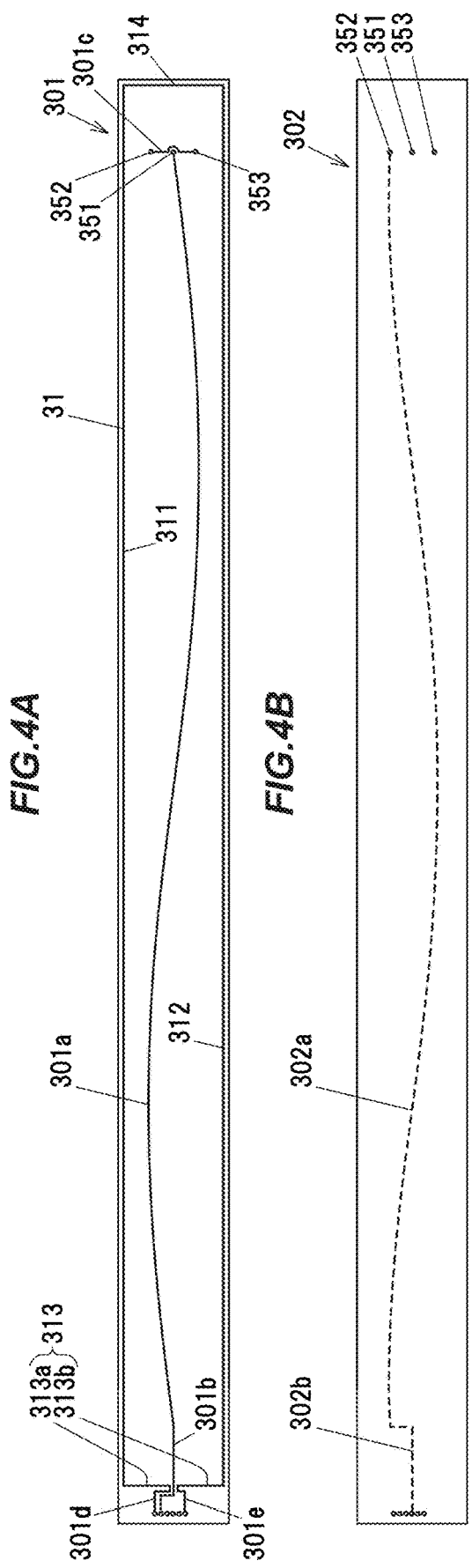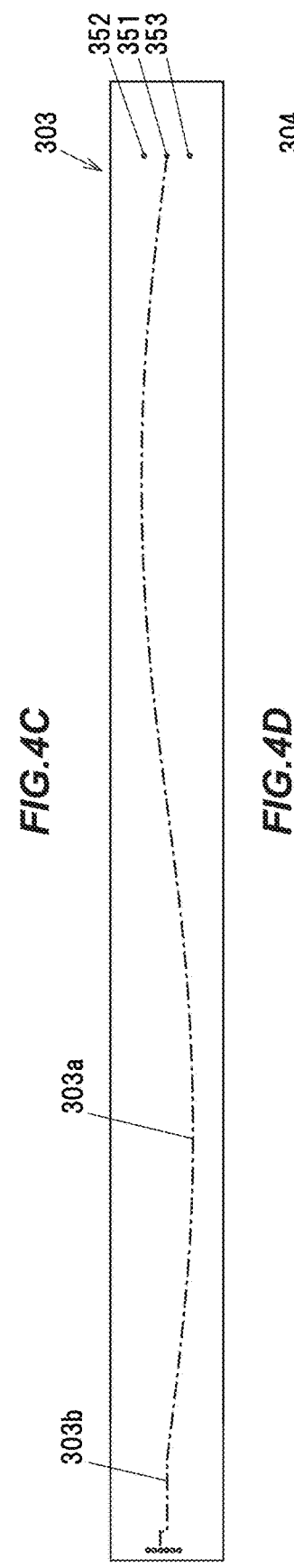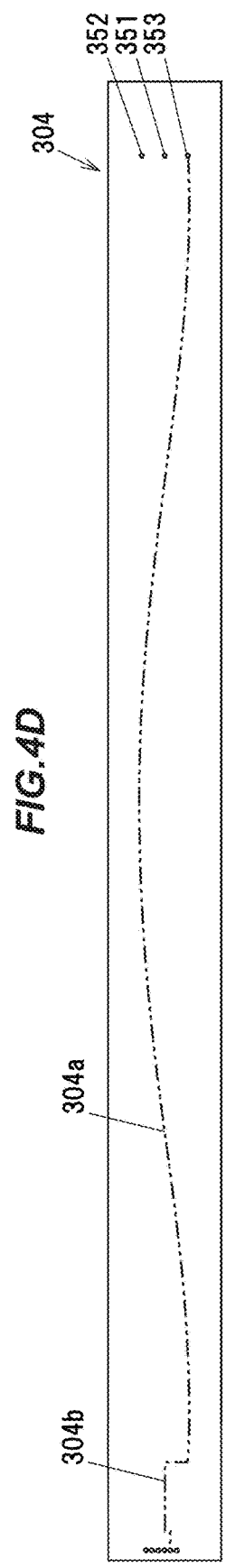

FIG.6A
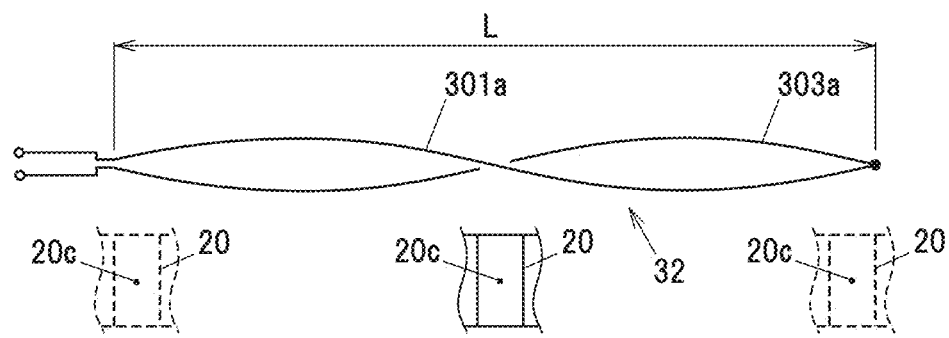
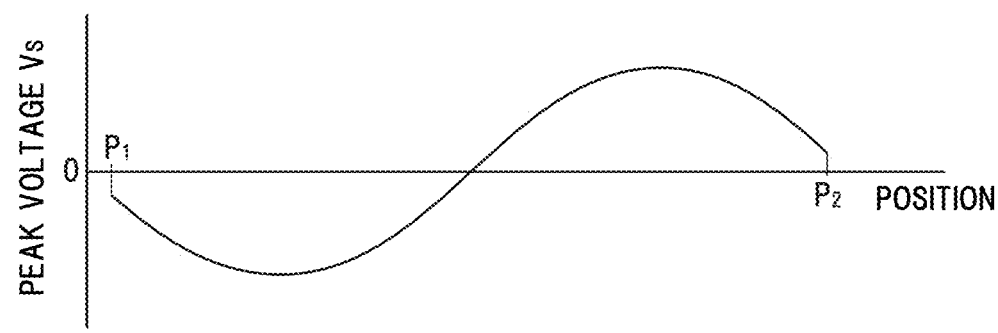
FIG.6B
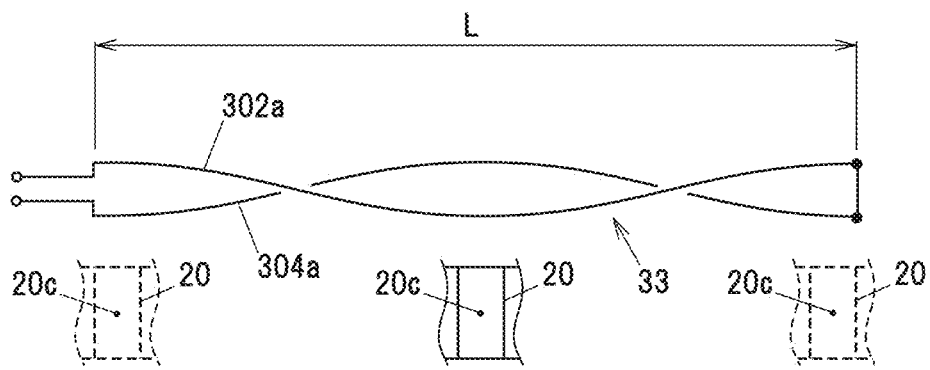
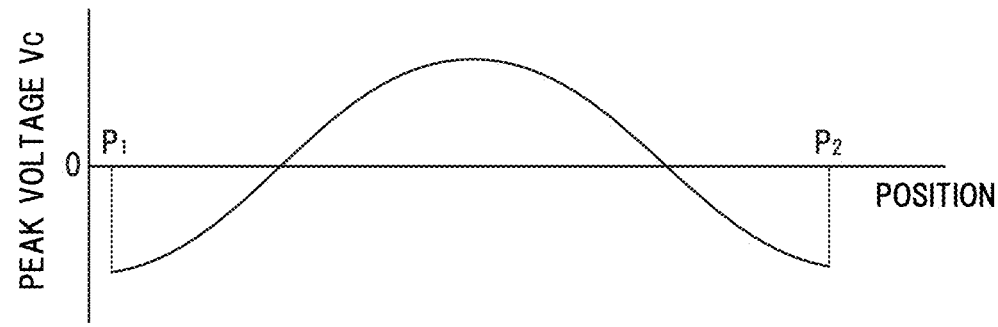

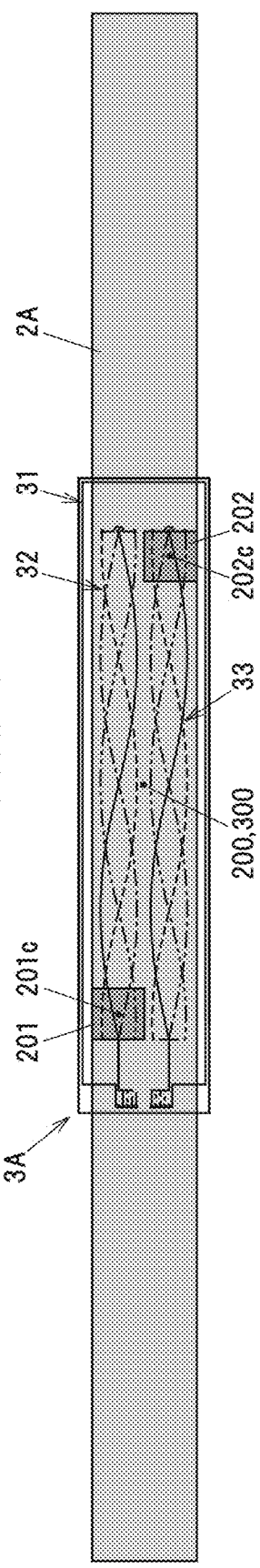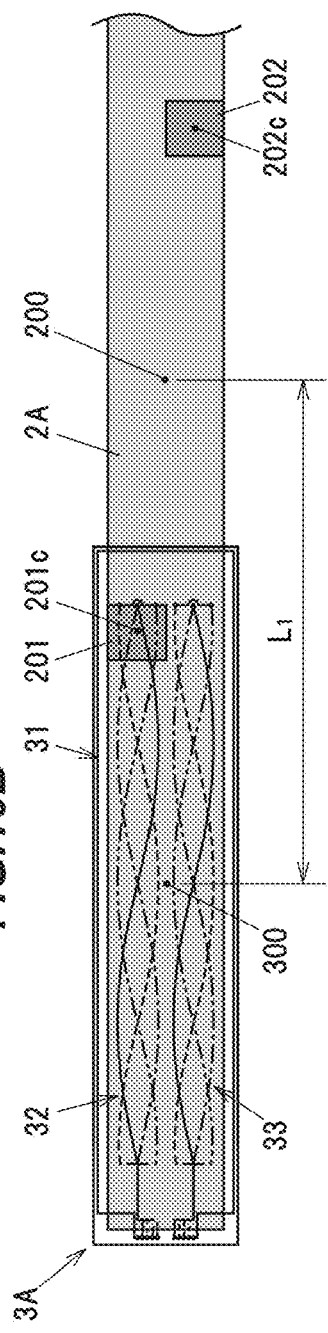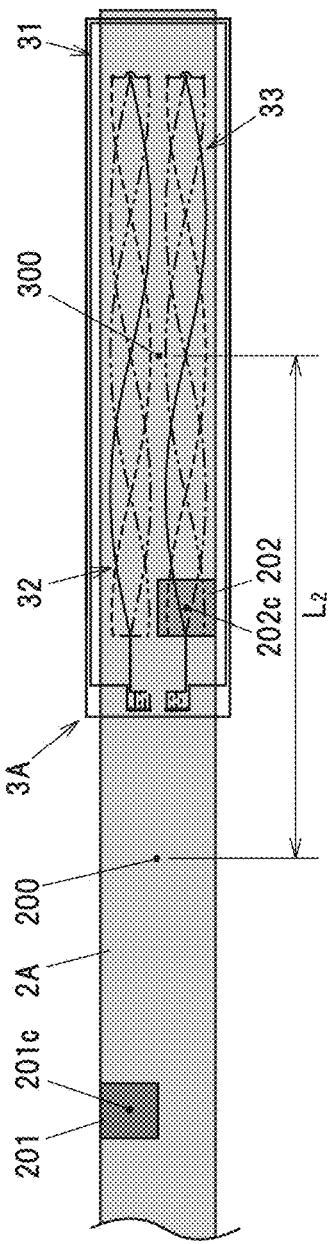

POSITION DETECTION DEVICE AND VEHICLE STEERING DEVICE

CROSS-REFERENCE TO RELATED APPLICATIONS

The present application is based on Japanese patent application No. 2022-153741 filed on Sep. 27, 2022, the entire contents of which are incorporated herein by reference.

TECHNICAL FIELD

The present invention relates to a position detection device for detecting the position of a moving member and a vehicle steering device equipped with the position detection device.

BACKGROUND OF THE INVENTION

Conventional position detection devices for detecting the position of moving members are used, e.g., in movable parts of automobiles. The applicant has proposed the stroke sensor described in Patent Literature 1 as such a position detection device.

The stroke sensor described in Patent Literature 1 comprises a magnetic field detecting part such as a Hall IC, two parallel yokes sandwiching the magnetic field detecting part in a stroke direction of a stroke body, a magnetic path forming yoke extending in the stroke direction of the stroke body with a predetermined distance between the two parallel yokes, a magnet disposed between one ends of the respective two parallel yokes and the magnetic path forming yoke, a magnet disposed between one end of each of the two parallel yokes and the magnetic path forming yoke, a parallel magnetic field forming yoke movably disposed between the two parallel yokes and the magnetic path forming yoke and facing the two parallel yokes, and a projection yoke integrally provided on the side of the magnetic path forming yoke in the parallel magnetic field forming yoke. This stroke sensor can detect the position of the parallel magnetic field forming yoke by the intensity of the magnetic field detected in the magnetic field detection part, since the intensity of the magnetic field changes according to the position of the parallel magnetic field forming yoke.

CITATION LIST

Patent Literature 1: JP2014-98655A

SUMMARY OF THE INVENTION

In the stroke sensor described in Patent Literature 1, the two parallel yokes and the magnetic path forming yoke must be arranged to sandwich the parallel magnetic field forming yoke and the projection yoke over the entire movement range of the parallel magnetic field forming yoke, resulting in a large installation size of the stroke sensor. Therefore, an object of the present invention is to provide a position detection device that can be downsized and a vehicle steering device equipped with the position detection device.

For the purpose of solving the above problem, one aspect of the present invention provides a position detection device configured to detect a position of a moving member moving backward and forward in a predetermined moving direction, comprising:

a conductive detection member attached to the moving member; and an exciting coil and a detection coil that are arranged extending in the moving direction of the moving member and facing the conductive detection member, wherein the conductive detection member includes a recessed portion recessed in a direction away from the exciting coil and the detection coil, wherein a voltage is induced in the detection coil by a current flowing in the conductive detection member due to a magnetic field generated by the exciting coil, and wherein a magnitude of the voltage induced in the detection coil varies with a position of the recessed portion relative to the detection coil.

Further, for the purpose of solving the above problem, another aspect of the present invention provides a vehicle steering device, comprising:

a shaft that moves axially forward and backward along a vehicle width direction;

a housing that houses the shaft; and a position detecting device that detects a position of the shaft relative to the housing, wherein a wheel is steered by axial movement of the shaft, wherein the position detection device comprises:

a conductive detection member attached to the shaft; and an exciting coil and a detection coil that are arranged extending in a moving direction of the shaft and facing the conductive detection member, wherein the conductive detection member includes a recessed portion recessed in a direction away from the exciting coil and the detection coil, wherein a voltage is induced in the detection coil by a current flowing in the conductive detection member due to a magnetic field generated by the exciting coil, and wherein a magnitude of the voltage induced in the detection coil varies with a position of the recessed portion relative to the detection coil.

Advantageous Effects of the Invention

According to the present invention, the position detection device can be downsized. In addition, the miniaturization of the position detection device improves the ease of installation of the vehicle steering device in a vehicle.

BRIEF DESCRIPTION OF DRAWINGS

FIGS. 4A to 4D are plan views showing the first to fourth metal layers viewed from the back surface side, respectively.

FIG. 6A is an explanatory diagram of the relationship between the peak voltage, which is the peak value of the induced voltage induced in the sine wave-shaped detection coil, and the position of a recessed portion.

FIG. 6B is an explanatory diagram of the relationship between the peak voltage, which is the peak value of the induced voltage induced in the cosine wave-shaped detection coil, and the position of the recessed portion.

FIGS. 10A to 10C are explanatory diagrams showing relative positional relationships of the first and second detection coils and the first and second recessed portions in a direction perpendicular to the substrate.

DETAILED DESCRIPTION OF THE INVENTION

First Embodiment

Figure 1A:
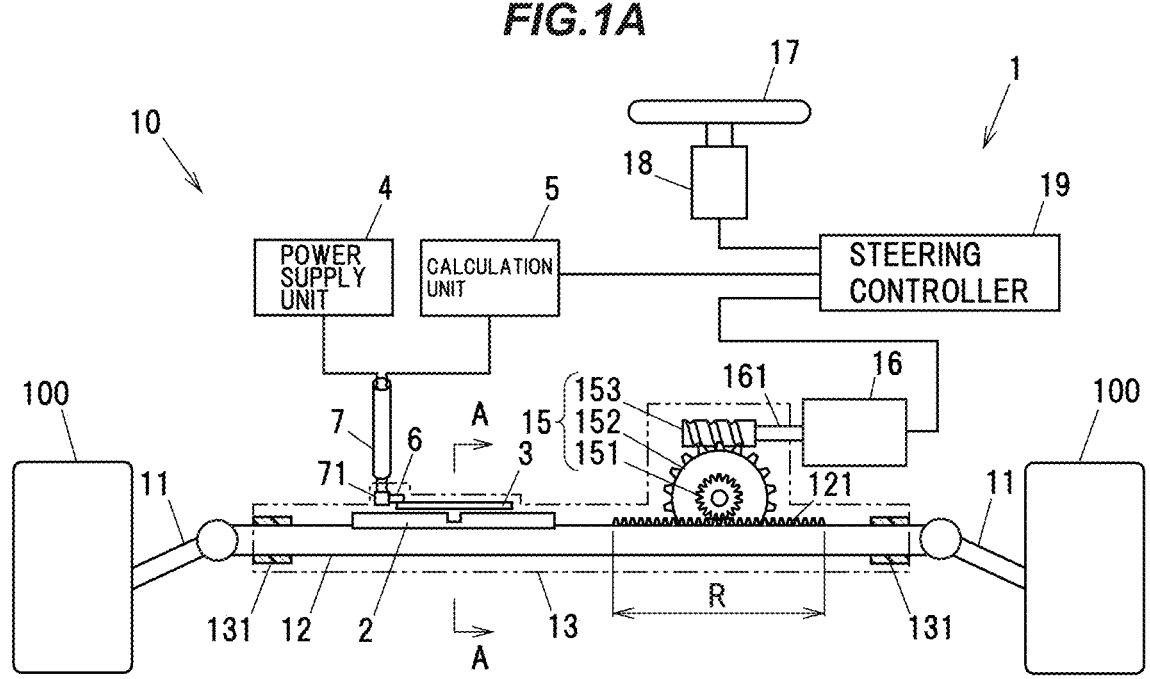
FIG. 1A is a schematic diagram of a portion of a vehicle equipped with a vehicle steering device according to the first embodiment of the present invention.
Figure 1B:
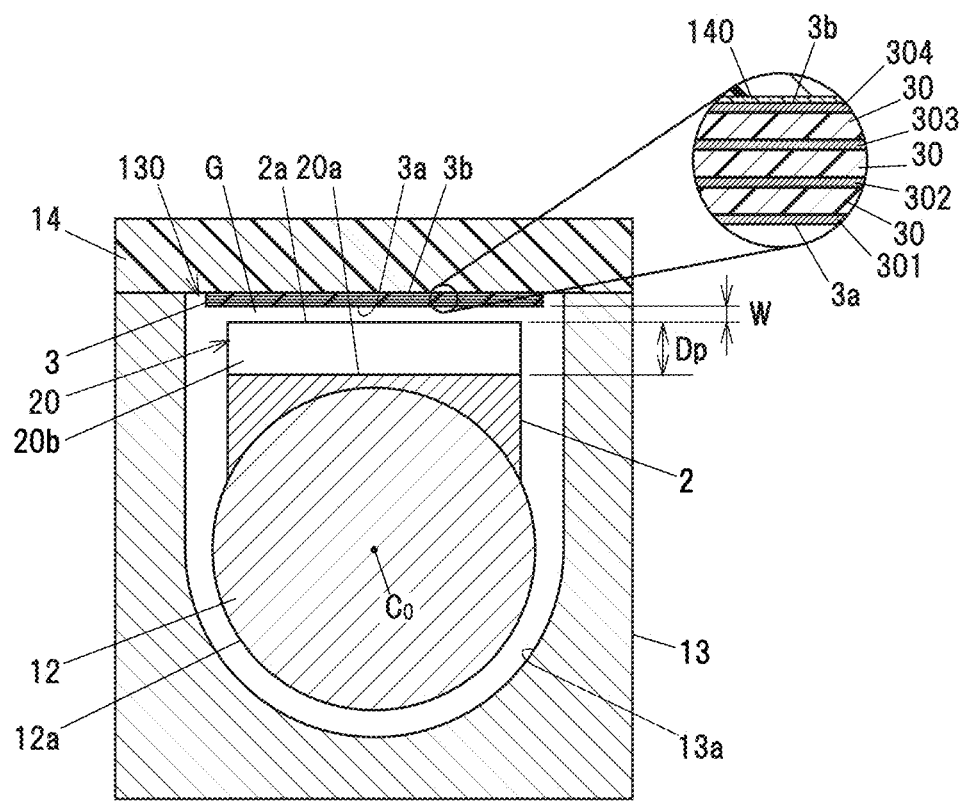
FIG. 1B is an A-A cross-sectional view of FIG. 1A.

FIG. 1A is a schematic diagram of a portion of a vehicle equipped with a vehicle steering device 1 according to an embodiment of the present invention. FIG. 1B is an A-A cross-sectional view of FIG. 1A.

This vehicle steering device 1 is a steer-by-wire steering device including a stroke sensor 2 as a position detection device. In FIG. 1A, the vehicle steering device 1 is viewed from the rear side in a vehicle front-rear direction, the right side of the drawing corresponds to the right side in a vehicle width direction, and the left side of the drawing corresponds to the left side in the vehicle width direction. The terms "right" and "left" are sometimes used in the following description with reference to the drawings, but this expression is used for convenience of explanation and does not limit the direction of arrangement when the stroke sensor 2 is actually in use.

As shown in FIG. 1A, the vehicle steering device 1 includes tie rods 11 connected to steered wheels 100 (left and right front wheels), a rack shaft 12 connected to the tie rods 11, a housing 13 that houses the rack shaft 12, a lid member 14 closing an opening of the housing 13 (see FIG. 1B), a worm speed reduction mechanism 15 having a pinion gear 151 meshed with rack teeth 122 of the rack shaft 12, an electric motor 16 that applies a moving force in a vehicle width direction to the rack shaft 12 through the worm speed reduction mechanism 15, a steering wheel 17 operated by a driver, a steering angle sensor 18 to detect a steering angle of the steering wheel 17, and a steering controller 19 that controls the electric motor 16 based on the steering angle detected by the steering angle sensor 18.

The rack shaft 12 is a moving member whose position relative to the housing 13 is detected by the stroke sensor 2. A moving direction of the rack shaft 12 is an axial direction parallel to a central axis Co of the rack shaft 12. The steered wheels 100 are steered by the movement in the axial direction of the rack shaft 12.

In FIG. 1A, the housing 13 is indicated by a phantom line, and an inside of the housing 13 is indicated by a solid line. The rack shaft 12 is supported by a pair of rack bushings 131 attached to both ends of the housing 13. The worm speed reduction mechanism 15 has a worm wheel 152 and a worm gear 153, and the pinion gear 151 is fixed to the worm wheel 152. The worm gear 153 is fixed to a motor shaft 161 of the electric motor 16.

The electric motor 16 generates torque by a motor current supplied from the steering controller 19 and rotates the worm wheel 152 and the pinion gear 151 through the worm gear 153. When the pinion gear 151 rotates, the rack shaft 12 linearly moves back and forth along the vehicle width direction. The rack shaft 12 can move to the right and left in the vehicle width direction within a predetermined range from a neutral position at which the steering angle is zero.

In FIG. 1A, a double-headed arrow indicates a stroke range R that corresponds to the maximum travel distance of the rack shaft 12 when the steering wheel 17 is operated from one of the left and right maximum steering angles to the other maximum steering angle. The stroke sensor 2 can detect the absolute position of the rack shaft 12 relative to the housing 13 over the entire stroke range R.

(Configuration of Stroke Sensor 10)

A stroke sensor 10 includes a detection target 2 which is made of a conductive metal and is attached to the rack shaft 12, a substrate 3 arranged to face the detection target 2, a power supply unit 4, and a calculation unit 5. The detection target 2 with electrical conductivity is arranged between the rack shaft 12 and the substrate 3 and moves forward and backward together with the rack shaft 12.

The stroke sensor 10 detects a position of the rack shaft 12 in an axial direction (movement direction) with respect to a housing 13, and outputs detected position data to a steering controller 19. The steering controller 19 controls an electric motor 16 in such a manner that the position of the rack shaft 12 detected by the stroke sensor 10 will be a position corresponding to a steering angle of a steering wheel 17 detected by a steering angle sensor 18.

Figure 2:
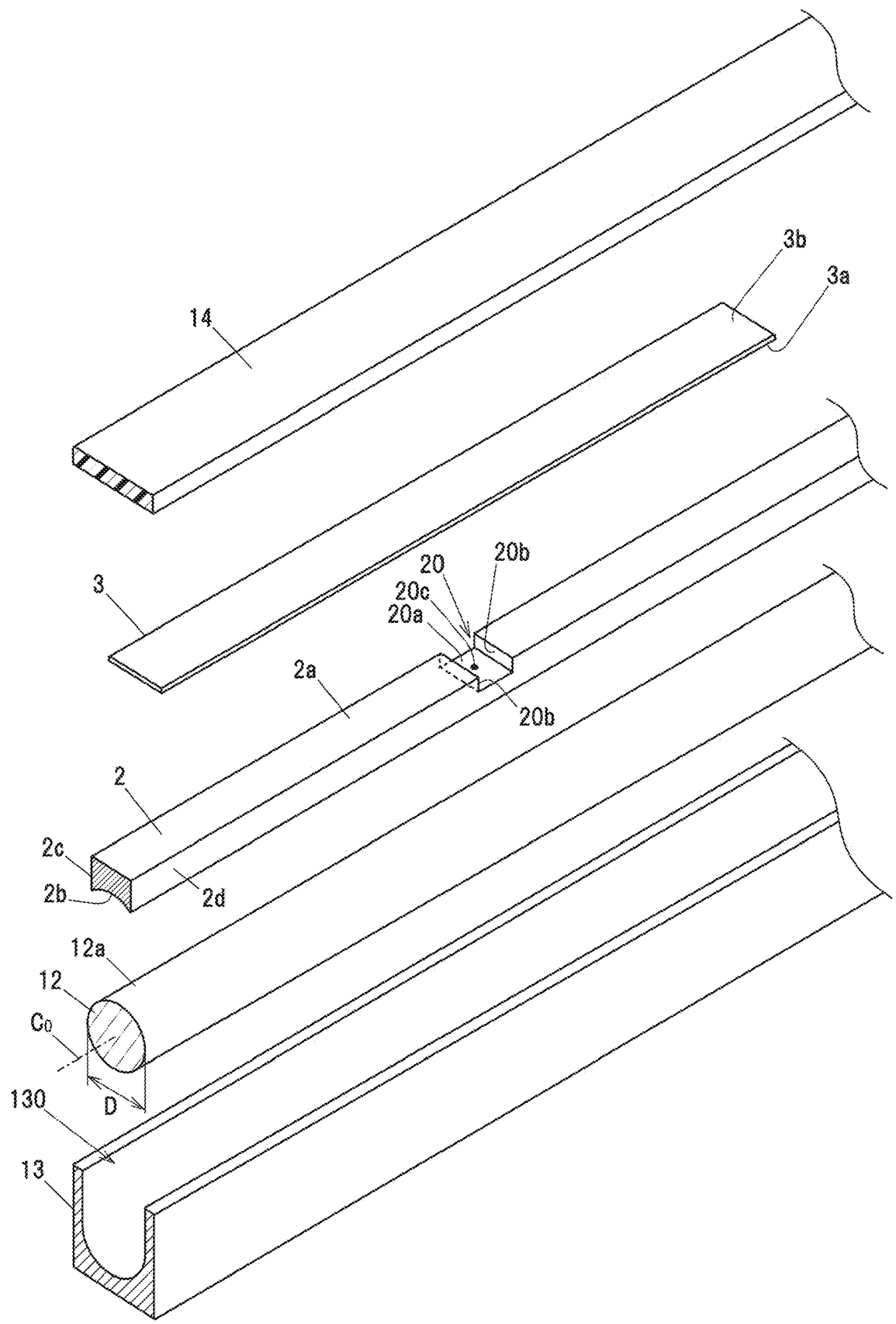
FIG. 2 is a perspective view showing a rack shaft, a housing, a lid member, and a substrate.

FIG. 2 is a perspective view showing the rack shaft 12, the housing 13, the lid member 14, the detection target 2, and the substrate 3. In FIG. 2, the housing 13, the lid member 14, the detection target 2, and the substrate 3 are shown spaced apart in the vertical direction in the drawing.

The rack shaft 12 is made of a carbon steel for machine structural use such as S45C, e.g., and has a circular cross-section perpendicular to the axial direction at a section where the detection target 2 is installed. A diameter D of the rack shaft 12 is, e.g., 25 mm. The housing 13 is, e.g., made of a die cast aluminum alloy having a U-shaped cross-section, and has an opening upward in a vertical direction. The opening 130 of the housing 13 is closed by the lid member 14. The rack shaft 12 and the housing 13 have electrical conductivity.

As shown in FIG. 1B, a gap of, e.g., 1 mm or more is formed between an outer circumference surface 12a of the rack shaft 12 and an inner surface 13a of the housing 13. The lid member 14 is a non-conductive member formed in the shape of a flat plate. For example, a resin such as an engineering plastic can be suitably used as the material of the lid member 14.

The detection target 2 is a conductive metal member, and is fixed to the outer circumference surface 12*a* of the rack shaft 12, e.g., by welding. As a metal material for the detection target 2, it is desirable to use a material with higher electrical conductivity than a material of the rack shaft 12, e.g., an aluminum alloy. However, the material of the detection target 2 can be the same as the material of the rack shaft 12. On the detection target 2, a facing surface 2*a* which faces the substrate 3 is a flat surface parallel to the substrate 3. A mounting surface 2*b* to be mounted on the rack shaft 12, on the back side of the facing surface 2*a* of the detection target 2, is a recessed surface curved with a curvature corresponding to a curvature of the outer circumference surface 12*a* of the rack shaft 12.

The detection target 2 has a recessed portion 20 formed in a direction perpendicular to the facing surface 2*a*. The recessed portion 20 is formed on an entire area between one side surface 2*c* and the other side surface 2*d* of the detection target 2, traversing the facing surface 2*a* in a direction perpendicular to the axial direction of the rack shaft 12. The recessed portion 20 is, e.g., formed by cutting. Since the detection target 2C can be formed also by casting, the recessed portion 20 can be shaped on a mold. Additionally, the materials and processing methods of detection target 2 described here are the same for detection targets 2A, 2B, and 2C according to the second to fourth embodiments described later.

A bottom surface 20*a* of the recessed portion 20 is a flat surface parallel to the facing surface 2*a*, and two side surfaces 20*b*, 20*b* of the recessed portion 20 face each other over the bottom surface 20*a* along the axial direction of the rack shaft 12. A depth Dp of the recessed portion 20 in a direction perpendicular to the facing surface 2*a* is, e.g., 5 mm. A rotation with a central axis line C0 at the center of the rack shaft 12 with respect to the housing 13 is controlled, so that the facing surface 2*a* of the detection target 2 faces the substrate 3 always in parallel.

The substrate 3 is installed to the lid member 14 so that a front surface 3*a* faces the detection target 2. The facing surface 2*a* of the detection target 2 faces the front surface 3*a* of the substrate 3 by way of an air gap G with a predetermined width. A width W of the air gap G is, e.g., 1 mm or less. A back surface 3*b* of the substrate 3 is fixed to the lid member 14 by an adhesive 140.

The substrate 3 is a four-layered substrate in which flat plate-shaped bases 30 made of a dielectric such as FR4 (glass fiber impregnated with epoxy resin and heat-cured) are arranged between first to fourth metal layers 301 to 304. A thickness of each base material 30 is, e.g., 0.3 mm. The first to fourth metal layers 301 to 304 are made of, e.g., copper and each have a thickness of, e.g., 18 μm. The substrate 3 has a flat rectangular shape whose long side direction (longitudinal direction) coincides with the moving direction of the rack shaft 12. The substrate 3 is not limited to a rigid substrate and may be a flexible substrate.

Figure 3A:
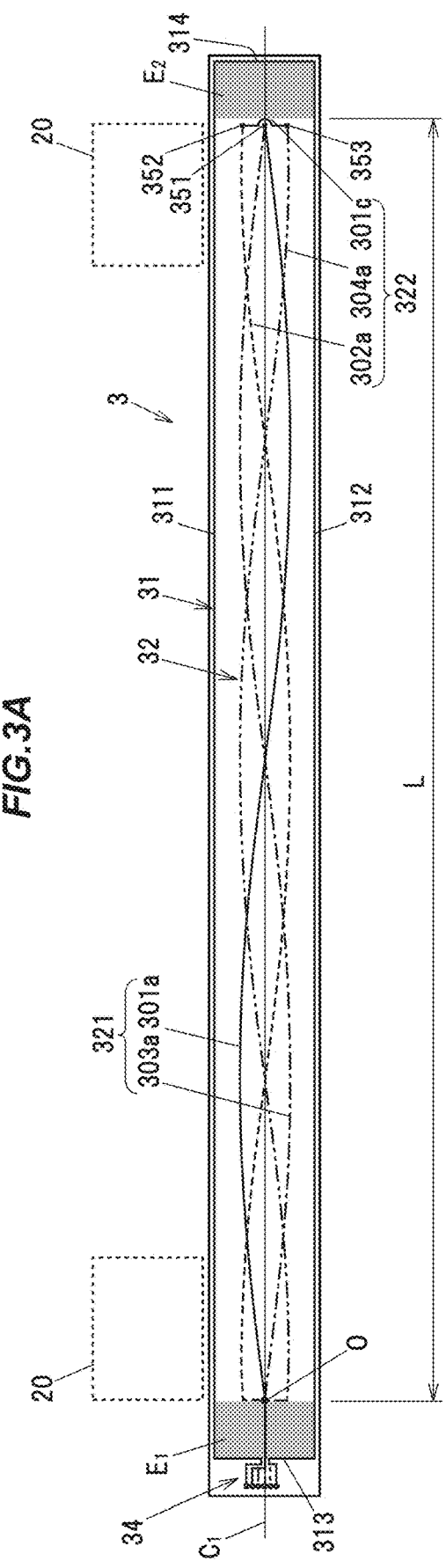
FIG. 3A is an overall view of wiring patterns formed in the first to fourth metal layers of the substrate, viewed from a back surface side in perspective.
Figure 3B:
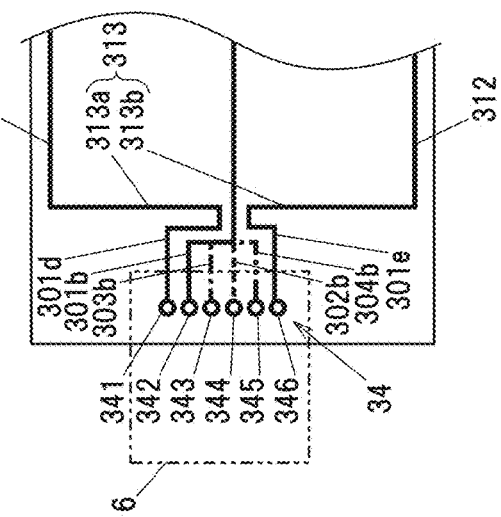
FIG. 3B is an partial enlarged view of FIG. 3A.

FIG. 3A is an overall view in which wiring patterns formed on first to fourth metal layers 301 to 304 of the substrate 3 are seen through from the back surface 3*b*-side. FIG. 3B is a partial enlarged view of FIG. 3A. FIGS. 4A to 4D are plan views respectively showing the first to fourth metal layers 301 to 304 as viewed from the back surface 3*a*-side. The wiring patterns shown in FIGS. 3A, 3B and 4A to 4D are merely examples, and various forms of wiring patterns can be employed as long as the substrate 3 is formed so that the effects of the invention can be obtained.

In FIGS. 3A, 3B and 4A to 4D, the wiring pattern of the first metal layer 301 is indicated by solid lines, the wiring pattern of the second metal layer 302 is indicated by dashed lines, the wiring pattern of the third metal layer 303 is indicated by dashed-dotted lines, and the wiring pattern of the fourth metal layer 304 is indicated by dashed-double-dotted lines. In FIG. 3A, a central axis $C_1$ that bisects the substrate 3 in the short direction and extends in the longitudinal direction is shown, and the position of the recessed portion 20 when the rack shaft 12 is located at one end and the other end of the range where the stroke sensor 2 can detect the absolute position of the rack shaft 12 is shown by dotted lines. The substrate 3 and the recessed portion 20 are aligned side by side in a direction perpendicular to the substrate 3, but in FIG. 3A, the position of the recessed portion 20 is shown shifted in its lateral direction (short side direction) relative to the substrate 3.

A connector portion 34, which has first to sixth through-holes 341 to 346 into which connector pins of a connector 6 indicated by a dashed-double-dotted line in FIG. 3B are respectively inserted, is provided at one longitudinal end portion of the substrate 3. The first to sixth through-holes 341 to 346 are aligned in a straight line along a lateral direction of the substrate 3. A connector 71 (see FIG. 1A) of a cable 7 for connection to the power supply unit 4 and the calculation unit 5 is connected to the connector 6. First to third vias 351 to 353 for inter-layer connection of the wiring patterns are also formed on the substrate 3.

An exciting coil 31 and a detection coil 32 are formed on the substrate 3 by wiring patterns formed on the first to fourth metal layers 301 to 304. The exciting coil 31 and the detection coil 32 extend in the movement direction of the rack shaft 12 and face the detection target 2. The recessed portion 20 is recessed in the direction away from the exciting coil 31 and the detection coil 32.

On the first metal layer 301, a curved portion 301*a*, a connector connection portion 301*b* that connects an end of the curved portion 301*a* to the second through-hole 342, and an end connection portion 301*c* that respectively connects each end of the curved portion 302*a* and the curved portion 304*a* of the second metal layer 302 and the fourth metal layer 304 which are explained below, are formed. On the second metal layer 302, the curved portion 302*a* and a connector connection portion 302*b* that connects an end of the curved portion 302*a* to the fourth through-hole 344 are formed. On the third metal layer 303, a curved portion 303*a* and a connector connection portion 303*b* that connects an end of the curved portion 303*a* to the third through-hole 343 are formed. On the fourth metal layer 304, the curved portion 304*a* and a connector connection portion 304*b* that connects an end of the curved portion 304*a* to the fifth through-hole 345 are formed.

The curved portion 301*a* of the first metal layer 301 and the curved portion 303*a* of the third metal layer 303 are connected at their other ends by a first via 351. One end of the end connection portion 301*c* is connected to the other end of the curved portion 302*a* of the second metal layer 302 by a second via 352, and the other end of the end connection portion 301*c* is connected to the other end of the curved portion 304*a* of the fourth metal layer 304 by a third via 353.

The curved portions 301*a*, 302*a*, 303*a*, and 304*a* of the first to fourth metal layers 301 to 304 are conductive wires curved in the sine wave shape. The curved portion 301*a* of the first metal layer 301 and the curved portion 303*a* of the third metal layer 303, and the curved portion 302*a* of the second metal layer 302 and the curved portion 304a of the fourth metal layer 304 are symmetrical about the central axis $C_1$ of the substrate 3 as the axis of symmetry.

The detection coil 32 has a sine wave-shaped coil element 321 comprising the curved portion 301a of the first metal layer 301 and the curved portion 303a of the third metal layer 303, and a cosine wave-shaped coil element 322 comprising the curved portion 302a of the second metal layer 302, the curved portion 304a of the fourth metal layer 304, and the end connection portion 301c of the first metal layer 301. In other words, the sine wave-shaped coil element 321 and a cosine wave-shaped coil element 322 respectively have a combination of two sinusoidal conductor wires (the curved portion 301a of the first metal layer 301 and the curved portion 303a of the third metal layer 303, and the curved portion 302a of the second metal layer 302 and the curved portion 304a of the fourth metal layer 304) that are symmetrical about the central axis $C_1$. The central axis $C_1$ is an axis of symmetry of the sine wave-shaped coil element 321 and the cosine wave-shaped coil element 322, and is parallel to the axial direction of the rack shaft 12.

The exciting coil 31 is rectangular in shape having a pair of long side portions 311, 312 extending in the axial direction of the rack shaft 12 and a pair of short side portions 313, 314 between the pair of long side portions 311, 312, and is formed to surround the detection coil 32. In this embodiment, the long side portions 311, 312 and the short side portions 313, 314 are formed as a wiring pattern in the first metal layer 301. Of the pair of short side portions 313, 314, the short side portion 313 on the connector portion 34-side comprises two straight portions 313a, 313b that sandwich the first to fourth connector connection portions 301b, 302b, 303b, 304b, as shown in FIG. 3B, and the respective ends of the two straight portions 313a, 313b are connected to the first through-hole 341 and the sixth through-hole 346 by the connector connection portions 301d, 301e formed in the first metal layer 301.

Additionally, the exciting coil 31 is not limited to the first metal layer 301, but it can be formed on any of the second to fourth metal layers 302 to 304, or it can be formed over multiple layers. Also, in the present embodiment, both the exciting coil 31 and the detection coil 32 are formed on the substrate 3, but the exciting coil 31 can be formed on a separate body from the substrate 3.

A sinusoidal alternating current is supplied to the exciting coil 31 from the power supply unit 4. Eddy currents are generated in the detection target 2 by the magnetic flux generated by the AC current supplied to the exciting coil 31. An induced voltage is generated on the detection coil 32 induced by the current of the detection target 2. The peak value of the voltage induced in the detection coil 32 varies depending on the position of the recessed portion 20 with respect to the detection coil 32. The peak value of the voltage refers to the maximum value of the absolute value of the voltage within a period of one cycle of the alternating current supplied to the exciting coil 31.

The phases of the voltages induced in the sine wave-shaped coil element 321 and the cosine wave-shaped coil element 322 of the detection coil 32 during the movement of the rack shaft 12 from one end of axial movement to the other end of axial movement are different from each other. In the present embodiment, an induced voltage phase of the sine wave-shaped coil element 321 and an induced voltage phase of the cosine wave-shaped coil element 322 differ by 90°.

The peak value of the voltage induced in the sine wave-shaped coil element 321 and the peak value of the voltage induced in the cosine wave-shaped coil element 322 by the magnetic flux of the detection target 2 chained together vary within a range of one cycle or less during the movement of the rack shaft 12 from one end of axial movement to the other end of axial movement. This enables the stroke sensor 2 to detect the absolute position of the rack shaft 12 over the entire stroke range R over which the rack shaft 12 can move in the axial direction.

As shown in FIG. 3A, between each of the pair of short side portions 313, 314 of the exciting coil 31 and the sine wave-shaped coil element 321 and the cosine wave-shaped coil element 322, first and second buffer regions $E_1$, $E_2$ are provided to suppress the voltage induced in the sine wave-shaped coil element 321 and the cosine wave-shaped coil element 322 by the magnetic flux generated due to the electric current flowing through the pair of short side portions 313, 314.

Figure 5:
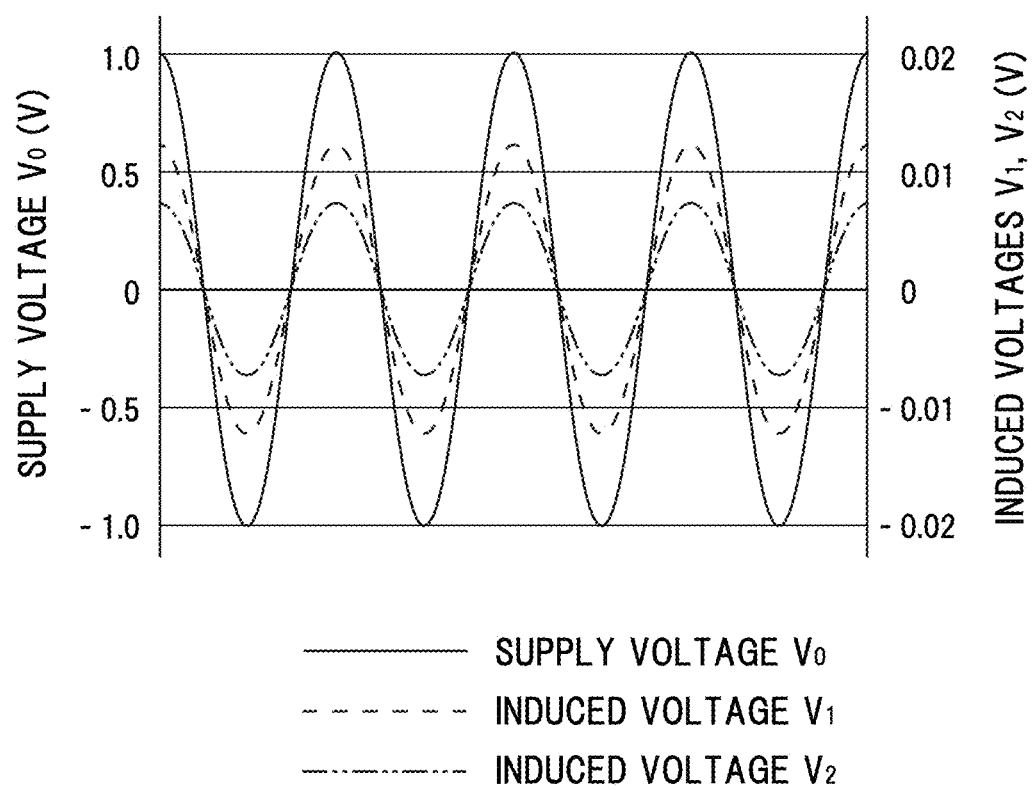
FIG. 5 is a graph showing an example of the relationship between the supply voltage supplied from a power supply unit to an exciting coil and the induced voltage induced in a sine wave-shaped detection coil and a cosine wave-shaped detection coil.

FIG. 5 is a graph showing an example of a relationship between supply voltage $V_0$ supplied from the power supply unit 4 to the exciting coil 31, an induced voltage $V_1$ induced in the sine wave-shaped coil element 321 and an induced voltage $V_2$ induced in the cosine wave-shaped coil element 322. In the graph of FIG. 5, the horizontal axis is the time axis, and the left and right vertical axes indicate the supply voltage $V_0$ and the induced voltages $V_1$, $V_2$. A high-frequency AC voltage of, e.g., about 1 MHz is supplied as the supply voltage $V_0$ to the exciting coil 31. The induced voltages $V_1$, $V_2$ are output to the calculation unit 5 via a cable 7 as output voltages of the sine wave-shaped coil element 321 and the cosine wave-shaped coil element 322.

The supply voltage $V_0$ and the induced voltages $V_1$, $V_2$ are in phase with each other in the example shown in FIG. 5. However, the induced voltage $V_1$ induced in the sine wave-shaped coil element 321 switches between in-phase and antiphase at the time that the recessed portion 20 passes through a position corresponding to an intersection point between the curved portion 301a of the first metal layer 301 and the curved portion 303a of the third metal layer 303 as viewed in a substrate normal direction that is perpendicular to the front surface 3a and the back surface 3b of the substrate 3. Likewise, the induced voltage $V_2$ induced in the cosine wave-shaped coil element 322 switches between in-phase and antiphase at the time that the recessed portion 20 passes through a position corresponding to an intersection point between the curved portion 302a of the second metal layer 302 and the curved portion 304a of the fourth metal layer 304 as viewed in the substrate normal direction.

FIG. 6A is an explanatory diagram schematically illustrating a relationship between the position of the recessed portion 20 and peak voltage $V_S$ which is the peak value of the induced voltage $V_1$ induced in the sine wave-shaped coil element 321. FIG. 6B is an explanatory diagram schematically illustrating a relationship between the position of the recessed portion 20 and peak voltage VC which is the peak value of the induced voltage $V_2$ induced in the sine wave-shaped coil element 322.

In the graphs of the peak voltages $V_S$ and $V_C$ shown in FIGS. 6A and 6B, the horizontal axis indicates the position of the center in the lateral direction of the recessed portion 20. $P_1$ on the horizontal axis indicates the position of a center point 20c of the recessed portion 20 when the left end of the recessed portion 20 coincides with the left ends of the sine wave-shaped coil element 321 and the sine wave-shaped coil element 322. $P_2$ on the horizontal axis indicates the position of the center point 20c of the recessed portion 20 when the right end of the recessed portion 20 coincides with the right ends of the sine wave-shaped coil element 321 and the sine wave-shaped coil element 322. In FIGS. 6A and 6B, the recessed portion 20 when its center point 20c is located at the position $P_1$ is indicated by a dashed-dotted line, and the recessed portion 20 when its center point 20c is located at the position $P_2$ is indicated by a dashed-double-dotted line. Here, the center point 20c of the recessed portion 20 is the location of the center of a bottom surface 20a, as shown in FIG. 2.

In the sine wave-shaped coil element 321 and the sine wave-shaped coil element 322, the strength of a magnetic field of a portion that faces the facing surface 2a of the detection target 2 other than the area where the recessed portion 20 is formed is stronger than the strength of the magnetic field of a portion which faces the recessed portion 20. Therefore, the output voltage of the sine wave-shaped coil element 321 and the sine wave-shaped coil element 322 varies according to the position of the rack shaft 12, due to the difference in the strength of the magnetic field. In the graph shown in FIG. 6A, the peak voltage $V_S$ has a positive value when the induced voltage $V_1$ induced in the sine wave-shaped coil element 321 is in phase with the supply voltage $V_0$ supplied to the exciting coil 31, and has a negative value when in antiphase. Likewise, in the graph shown in FIG. 6B, the peak voltage $V_C$ has a positive value when the induced voltage $V_2$ induced in the sine wave-shaped coil element 322 is in phase with the supply voltage $V_0$ supplied to the exciting coil 31, and has a negative value when in antiphase.

When the rack shaft 12 moves at a constant speed in one direction from one moving end to the other moving end, the peak voltage $V_S$ changes sinusoidally and the peak voltage $V_C$ changes cosinusoidally as shown in FIGS. 6A and 6B. Thus, the calculation unit 5 can determine the position of the rack shaft 12 by calculation based on the output voltages of the sine wave-shaped coil element 321 and the sine wave-shaped coil element 322.

As shown in FIG. 3A, a position X of the rack shaft 12 can be obtained by the following formula (1), where the position of the left ends of the sine wave-shaped coil element 321 and the sine wave-shaped coil element 322 in the longitudinal direction of the substrate 3 is a reference position O, the length of the sine wave-shaped coil element 321 and the sine wave-shaped coil element 322 in the longitudinal direction of the substrate 3 is L, the position X of the rack shaft 12 when the center point 20c of the recessed portion 20 is aligned with the reference position O in the vertical direction of the substrate is 0 (zero) and the direction from the reference position O to the right ends of the sine wave-shaped coil element 321 and the sine wave-shaped coil element 322 is the positive side of the position X of the rack shaft 12, the position X of the rack shaft 12 can be obtained by the following formula (1).

Formula (1)

$$X = L \frac{\tan^{-1}\left(\frac{V_S}{V_C}\right)}{2\pi} \quad (1)$$

The calculation unit 5 outputs the position obtained by formula (1) based on the output voltages of the sine wave-shaped coil element 321 and the sine wave-shaped coil element 322 to the steering controller 19 as the position of the rack shaft 12.

When the ratio of the length of the recessed portion 20 in the axial direction of the rack shaft 12 to the length L of the sine wave-shaped coil element 321 and the sine wave-shaped coil element 322 is u, the calculation unit 5 can obtain the absolute position of the rack shaft 12 within the length range of (1−u)L. The length of the detection target 2 in the axial direction of the rack shaft 12 is 2(1−u)L or more. Therefore, the detection coil 32 always faces the facing surface 2a of the detection target 2, except a portion facing the recessed portion 20, while the rack shaft 12 is moving from one end to the other in the axial direction.

The value of u is smaller than 0.5. The smaller the value of u, the more the absolute position of the rack shaft 12 can be detected over a longer distance, but if the value of u is too small, the induced voltages $V_1$, $V_2$ become smaller and the error is likely to increase. Therefore, the value of u is preferably 0.01 or more and less than 0.5, for example.

Effects of the First Embodiment

According to the first embodiment described above, the position of the rack shaft 12 can be detected by arranging the detection target 2 mounted onto the rack shaft 12 to face the substrate 3, the size of installation area of the stroke sensor 10 can be reduced. Also, by reducing the size of installation area of the stroke sensor 10, it is possible to reduce the size and weight of the vehicle steering device 1.

Second Embodiment

Next, the second embodiment of the present invention is explained with reference to FIGS. 7 to 11. Regarding components of the second embodiment shown in FIGS. 7 to 11, the explanations are omitted for common things with the first embodiment, but the same reference numerals used in the description of the first embodiment are used.

Figure 7:
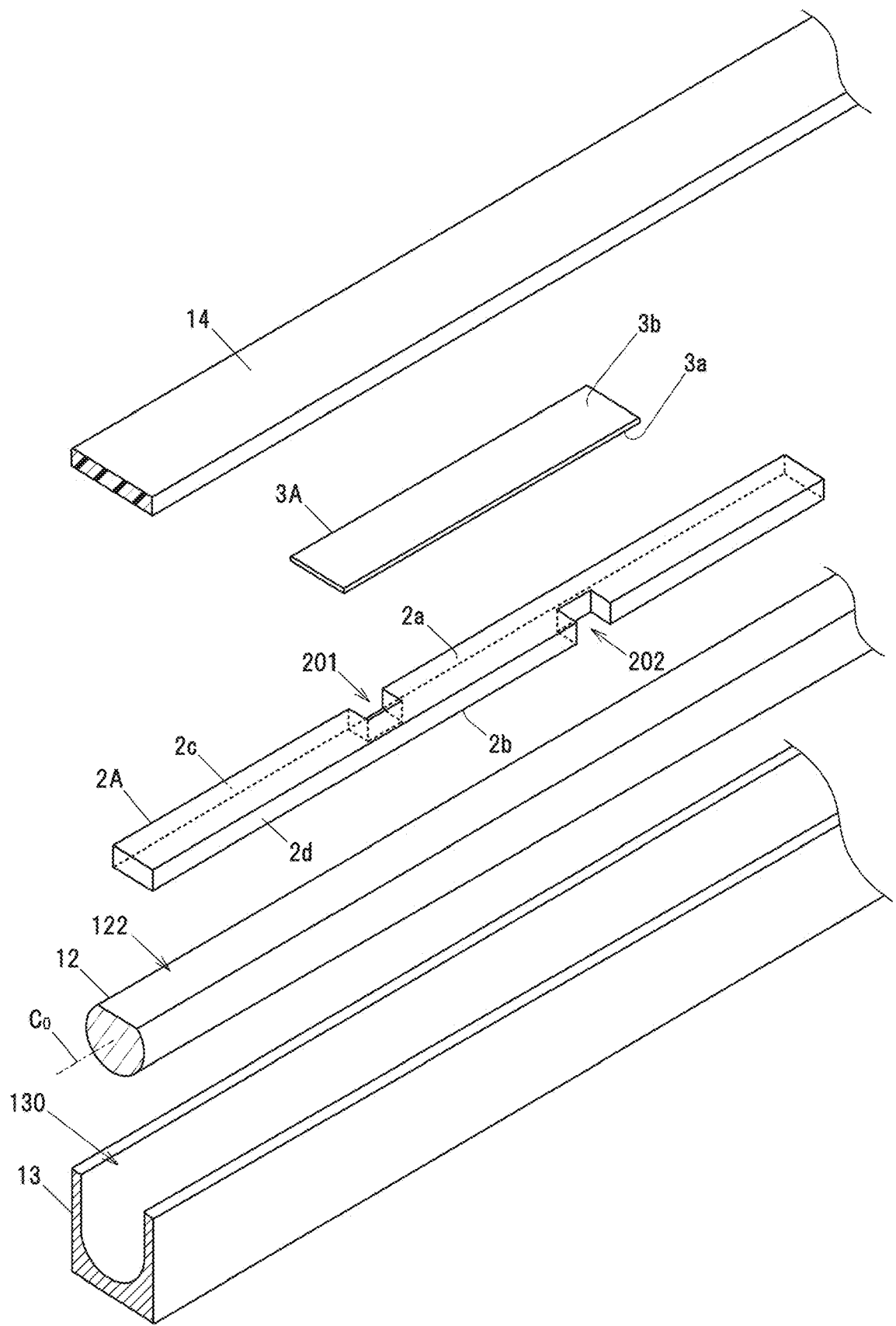
FIG. 7 is a perspective view showing a detection target and a substrate according to the second embodiment, together with the rack shaft, the housing, and the lid member.

FIG. 7 is a perspective view showing a detection target 2A and a substrate 3A according to the second embodiment, together with the rack shaft 12, the housing 13, and the lid member 14.

In the first embodiment, the cross-section of the rack shaft 12 is circular at a section where the detection target 2 is installed, but in the present embodiment, the rack shaft 12 has a flat surface 122, and the cross-section of the rack shaft 12 at a section where the detection target 2A is installed is D-shaped.

The detection target 2A is formed in a shape of a flat plate having a longer side in the axial direction of the rack shaft 12, and the facing surface 2a facing the substrate 3A is a flat plane parallel to the substrate 3A. In the detection target 2A, the mounting surface 2b to be mounted on the rack shaft 12 is a flat plane parallel to the facing surface 2a. The detection target 2A can be mounted on the rack shaft 12 by placing the mounting surface 2b on the flat surface 122 of the rack shaft 12 and fixing by welding, for example.

A first recessed portion 201 and a second recessed portion 202 are formed on the detection target 2A, which are recessed in the direction away from the substrate 3A. The detection target 2A has side surfaces 2c and 2d, and the first recessed portion 201 is open toward the side surface 2c while the second recessed portion 202 is open toward the side surface 2d. Also, in the present embodiment, the first and second the recessed portions 201 and 202 penetrate in a direction of a plate thickness between the facing surface 2a and the mounting surface 2b of the detection target 2A.

Figures 8A, 8B:
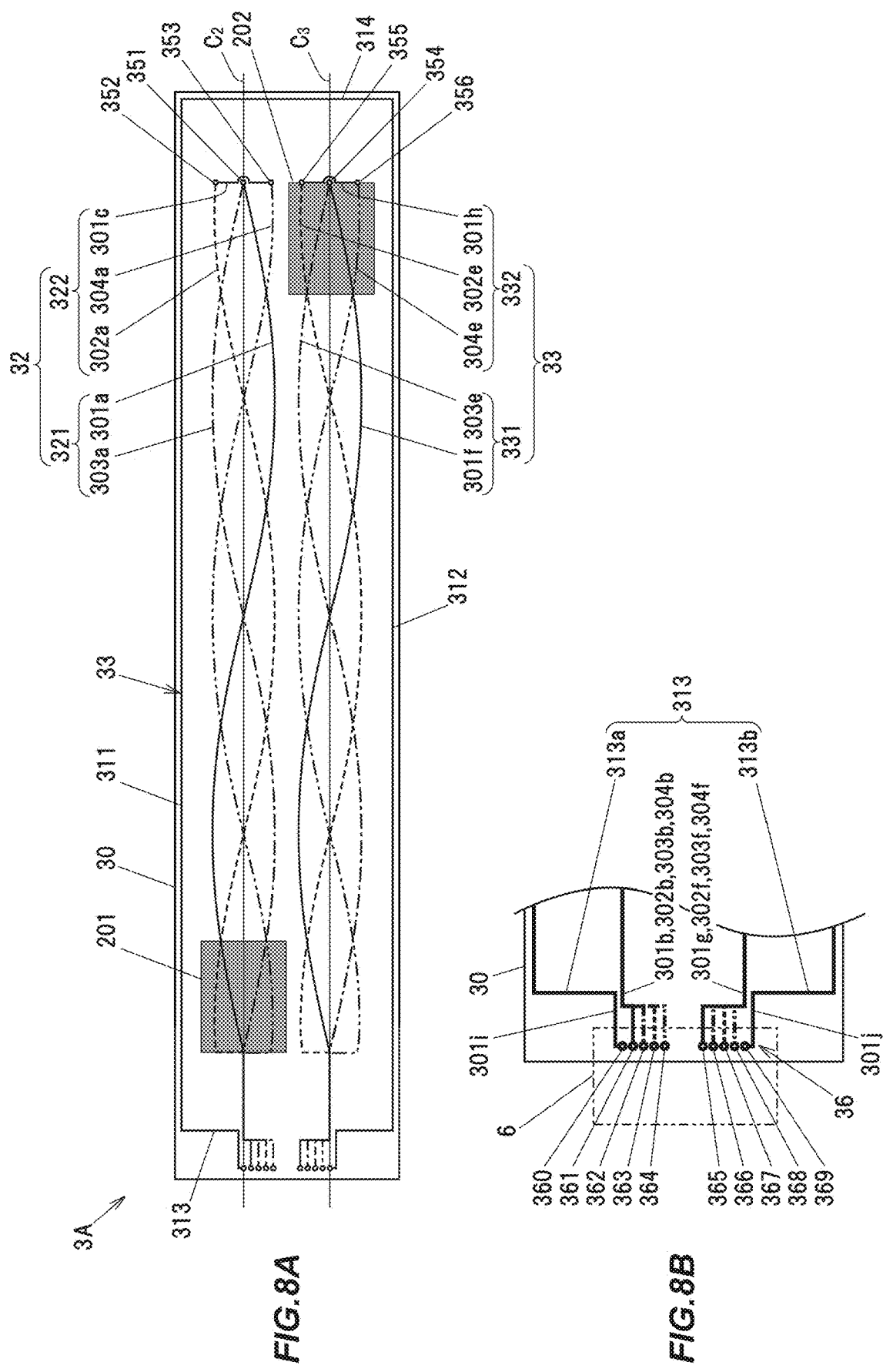
FIG. 8A is an overall view of wiring patterns formed in the first to fourth metal layers of the substrate, viewed from a back surface side in perspective.
FIG. 8B is an partial enlarged view of FIG. 8A.
Figure 9A:
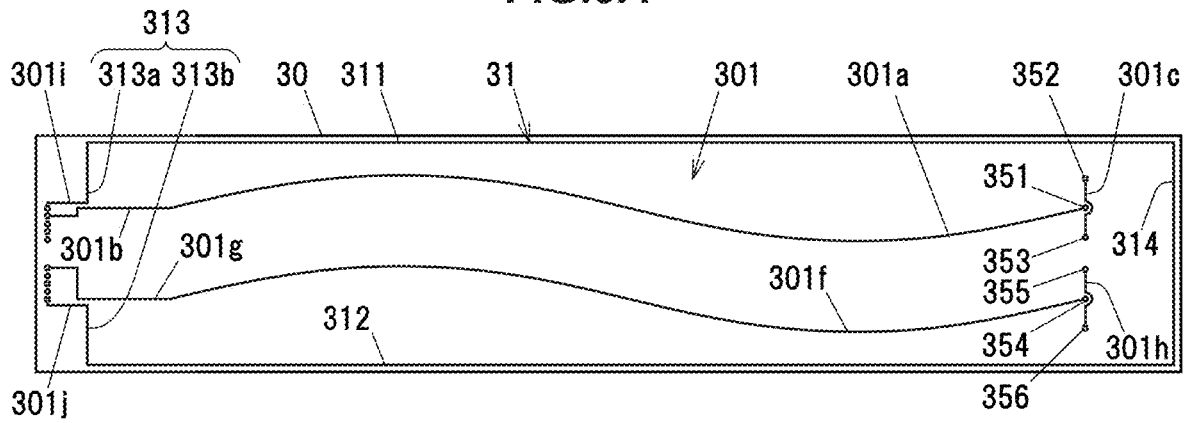
FIGS. 9A to 9D are plan views showing the first to fourth metal layers viewed from the back surface side, respectively.
Figure 9B:
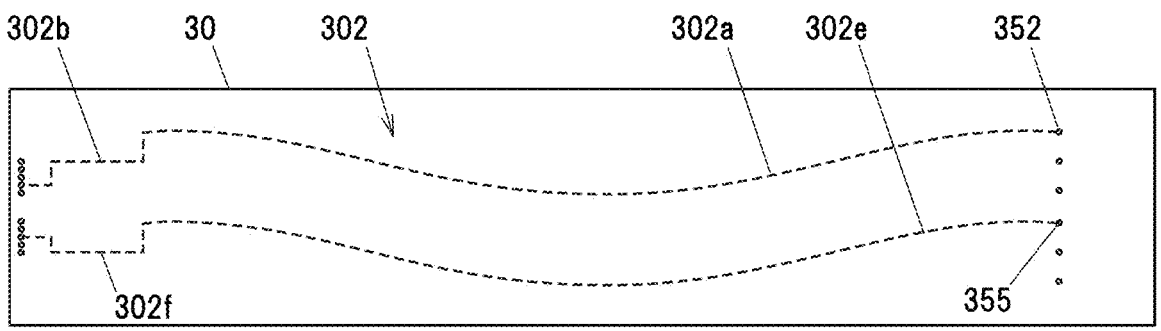
Figure 9C:
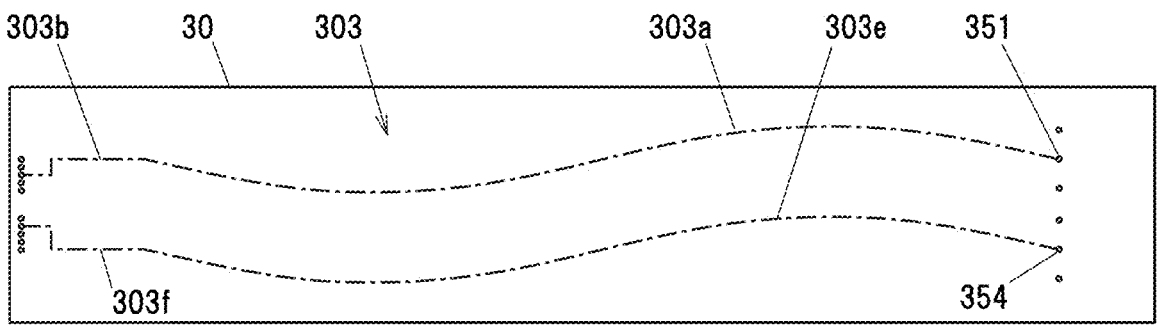
Figure 9D:
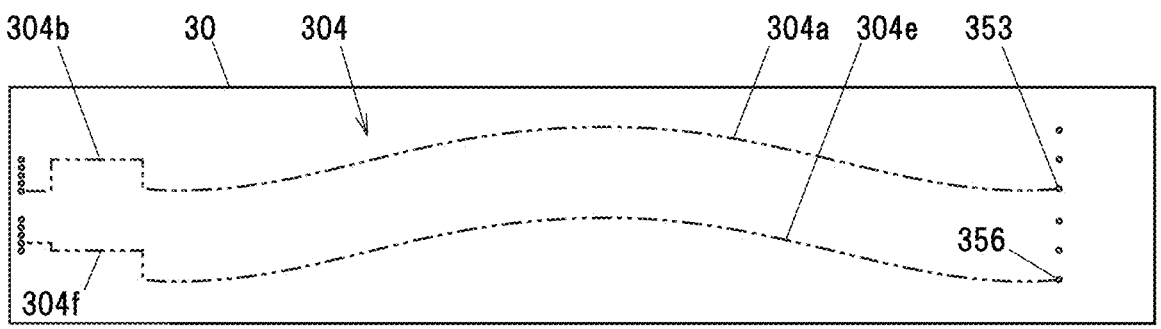

FIG. 8A shows an overall view of the wiring patterns formed on the first to fourth metal layers 301 to 304 of the substrate 3A, seeing through from the back surface 3b. B is a partially enlarged view of A. FIG. 9A to D are plan views respectively show the first to fourth metal layers 301 to 304, seeing from the back surface 3b.

In the first embodiment, a case where one detection coil 32 is formed on the substrate 3 has been explained, but in the present embodiment, in addition to the detection coil 32, a second detection coil 33 that is configured in the same way as the detection coil 32, is formed on the substrate 3A. Hereinafter, the two detection coils 32 and 33 are respectively called the first detection coil 32 and the second detection coil 33.

The first recessed portion 201 of the detection target 2A is formed corresponding to the first detection coil 32. The second recessed portion 202 is formed corresponding to the second detection coil 33. FIG. 8A shows by gray shading the positions of the first recessed portion 201 and the second recessed portion 202 when the rack shaft 12 is placed at the center of an area where the position of the rack shaft 12 can be detected by the first and second detection coils 32 and 33.

On the substrate 3A, the exciting coil 31 is formed to surround the first detection coil 32 and the second detection coil 33 collectively. The exciting coil 31 extends in the movement direction of the rack shaft 12, and the first detection coil 32 and the second detection coil 33 are formed side by side in a direction perpendicular to the extending direction of the exciting coil 31 (latitudinal direction of the substrate 3A).

The substrate 3A is a four-layer substrate having the first to fourth metal layers 301 to 304. On the first metal layer 301, in addition to the curved portion 301a, the connector connection portion 301b, the end connection portion 301c, and long side portions 311 and 312 and short side portions 313 and 314, a curved portion 301f, a connector connection portion 301g, an end connection portion 301h, connector connection portion 301i and 301j are formed. On the second metal layer 302, in addition to the curved portion 302a and the connector connection portion 302b, a curved portion 302e and a connector connection portion 302f are formed. On the third metal layer 303, in addition to the curved portion 303a and the connector connection portion 303b, a curved portion 303e and a connector connection portion 303f are formed. On the fourth metal layer 304, in addition to the curved portion 304a and the connector connection portion 304b, a curved portion 304e and a connector connection portion 304f are formed.

On the substrate 3A, a connector portion 36 composed of first to tenth through-holes 360 to 369 is formed. Similarly to the first embodiment, a connector 6 that fits in a connector 71 of the cable 7 is connected to the connector portion 36 to connect the substrate 3A and the power supply unit 4 and the calculation unit 5. Also, on the substrate 3A, in addition to the first to third vias 351 to 353, fourth to sixth vias 354 to 356 are formed for interlayer connections. These components of the substrate 3A are connected as shown in FIGS. 8A, 8B and FIGS. 9A to 9D, and configure the exciting coil 31 as well as the first and second detection coils 32 and 33.

The first detection coil 32 includes, similarly to the detection coil 32 of the first embodiment, the sine wave-shaped coil element 321 composed of the curved portion 301a of the first metal layer 301 and the curved portion 303a of the third metal layer 303, and the cosine wave-shaped coil element 322 composed of the curved portion 302a of the second metal layer 302, the curved portion 304a of the fourth metal layer 304, and the end connection portion 301c of the first metal layer 301.

The second detection coil 33 includes a sine wave-shaped coil element 331 composed of the curved portion 301f of the first metal layer 301 and the curved portion 303e of the third metal layer 303, and a cosine wave-shaped coil element 332 composed of the curved portion 302e of the second metal layer 302, the curved portion 304e of the fourth metal layer 304, and the end connection portion 301h of the first metal layer 301.

The substrate 3A has a rectangular shape with a longitudinal direction in the axial direction of the rack shaft 12, and the sine wave-shaped coil element 321 and the cosine wave-shaped coil element 322 of the first detection coil 32 are symmetrical about the first symmetry axis $C_2$ along the longitudinal direction of the substrate 3A. The sine wave-shaped coil element 331 and the cosine wave-shaped coil element 332 of the second detection coil 33 are symmetrical about a second symmetry axis $C_3$ parallel to the first symmetry axis $C_2$. The first detection coil 32 and the second detection coil 33 have equal lengths in the longitudinal direction and equal widths in the latitudinal direction of the substrate 3A.

In the first detection coil 32, when the rack shaft 12 moves at a constant speed in one direction, while the first recessed portion 201 is at the position facing the first detection coil 32, the peak voltage, which is the peak value of the induced voltage induced in the sine wave-shaped coil element 321 changes sinusoidally, at the same time, the peak voltage, which is the peak value of the induced voltage induced in the cosine wave-shaped coil element 322 changes cosinusoidally. These induced voltages are output to the calculation unit 5 as output voltages of the sine wave-shaped coil element 321 and the cosine wave-shaped coil element 322. The calculation unit 5 can determine the position of the rack shaft 12 by calculation based on the output voltages of the sine wave-shaped coil element 321 and the cosine wave-shaped coil element 322.

Likewise, in the second detection coil 33, when the rack shaft 12 moves at a constant speed in one direction, while the second recessed portion 202 is at the position facing the second detection coil 33, the peak voltage, which is the peak value of the induced voltage induced in the sine wave-shaped coil element 331 changes sinusoidally, at the same time, the peak voltage, which is the peak value of the induced voltage induced in the cosine wave-shaped coil element 332 changes cosinusoidally. These induced voltages are output to the calculation unit 5 as output voltages of the sine wave-shaped coil element 331 and the cosine wave-shaped coil element 332. The calculation unit 5 can determine the position of the rack shaft 12 by calculation based on the output voltages of the sine wave-shaped coil element 331 and the cosine wave-shaped coil element 332.

FIGS. 10A to 10C are explanatory diagrams showing relative positions among the first and second detection coils 32 and 33 and the first and second recessed portions 201 and 202, in a direction perpendicular to the substrate. FIGS. 10A to 10C show the exciting coil 31, the first and second detection coils 32 and 33, and the detection target 2A overlapped in a direction perpendicular to the substrate, seeing through a base material 30 from the back surface 3b of the substrate 3A. Also, in FIGS. 10A to 10C, the detection target 2A is shown in light gray and the first and second recessed portions 201 and 202 are shown in thick gray. Furthermore, FIGS. 10A to 10C show the center point 300 in the area where the first and second detection coils 32 and 33 are formed, center points 201c and 202c of the first and second recessed portions 201 and 202 respectively, and a middle point 200 of these center points 201c and 202c on the substrate 3A.

FIG. 10A shows a state where a steering angle of the steering wheel 17 is zero, the rack shaft 12 is at a neutral position, and the middle point 200 and the center point 300 are aligned (i.e., coincide with each other). In this state, a left end of the first recessed portion 201 and a left end of the first detection coil 32 are aligned, and a right end of the second recessed portion 202 and a right end of the second detection coil 33 are aligned.

FIG. 10B shows a state where a right end of the first recessed portion 201 and a right end of the first detection coil 32 are aligned. A distance between the middle point 200 and the center point 300 in this state is $L_1$. The range of $L_1$ shows a detectable range (i.e., detectable area) where the position of the detection target 2A can be detected by the first detection coil 32.

FIG. 10C shows a state where a left end of the second recessed portion 202 and a left end of the second detection coil 33 are aligned. A distance between the middle point 200 and the center point 300 in this state is $L_2$. The range of $L_2$ shows a detectable range where the position of the detection target 2A can be detected by the second detection coil 33.

In this way, the detectable range where the position of the detection target 2A can be detected by the first detection coil 32 and the detectable range where the position of the detection target 2A can be detected by the second detection coil 33 are offset in the movement direction of the rack shaft 12. Additionally, at the neutral position of the rack shaft 12, the position of the detection target 2A can be detected by the first detection coil 32, and at the same time, the position of the detection target 2A can be detected by the second detection coil 33. In other words, the detectable range where the position of the detection target 2A can be detected by the first detection coil 32 and the detectable range where the position of the detection target 2A can be detected by the second detection coil 33 are in series in the movement direction of the rack shaft 12, partially overlapped.

The calculation unit 5 can determine the position of the rack shaft 12 by calculation, with the neutral position of the rack shaft 12 as a center and in the range of the length of $L_1+L_2$ in the axial direction. The length of $L_1+L_2$ is equal to or longer than the length of the stroke range R (see FIGS. 1A and 1B) of the rack shaft 12, the position of the rack shaft 12 can be detected in the entire stroke range R.

Figure 11:
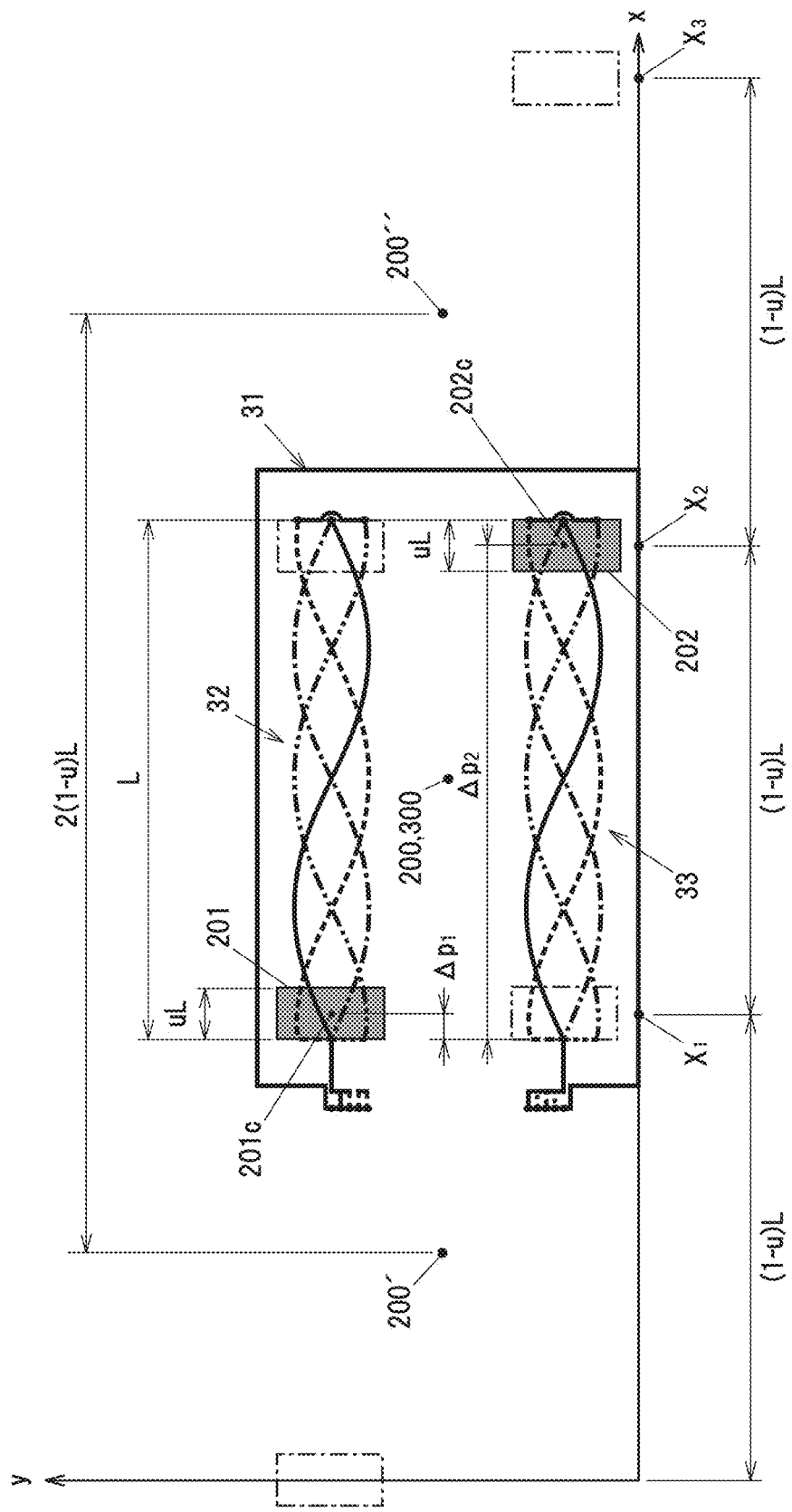
FIG. 11 is a schematic diagram showing a dimensional correlation of the exciting coil, the first and second detection coils, and the first and second recessed portions on the substrate.

FIG. 11 is a schematic diagram showing a dimensional correlation of the exciting coil 31, the first and second detection coils 32 and 33, and the first and second recessed portions 201 and 202 on the substrate 3A. In FIG. 11, the axial direction of the rack shaft 12 is an x-axis direction, and a direction parallel to the substrate 3A and perpendicular to the x-axis direction is a y-axis direction. Also, in FIG. 11, the dimension in the y-axis direction of the exciting coil 31 and the first and second detection coils 32 and 33 are doubled in size, and an interval between the first detection coil 32 and the second detection coil 33 is enlarged in the y-axis direction.

The origin of the x-axis is a position of the center point 201c of the first recessed portion 201 in a state shown in FIG. 10C, and the origin of the y-axis is a position of a long side 312 of the exciting coil 31. A coordinate point $X_1$ in the x-axis shows a position of the center point 201c of the first recessed portion 201 in the x-axis direction in a state shown in FIG. 10A, a coordinate point $X_2$ in the x-axis shows a position of the center point 202c of the second recessed portion 202 in the x-axis direction in the state shown in FIG. 10A. A coordinate point $X_3$ in the x-axis shows a position of the center point 202c of the second recessed portion 202 in the x-axis direction in a state shown in FIG. 10B. A coordinate point 200' shows the middle point 200 of the center points 201c and 202c of the first and second recessed portions 201 and 202 in the state shown in FIG. 10C, and a coordinate point 200" is the middle point 200 of the center points 201c and 202c of the first and second the recessed portion 201 and 202 in the state shown in FIG. 10B.

L in FIG. 11 is a length of the first and second detection coils 32 and 33 in the x-axis direction. u is a length ratio with respect to L of the first and second the recessed portion 201 and 202 in the x-axis direction. $\Delta p_1$ is a distance from the left ends of the first and second detection coils 32 and 33 to the center point 201c of the first recessed portion 201 in the x-axis direction. $\Delta p_2$ is a distance from the left ends of the first and second detection coils 32 and 33 to the center point 202c of the second recessed portion 202 in the x-axis direction.

When the first recessed portion 201 is overlapped on the sine wave-shaped coil element 321 and the cosine wave-shaped coil element 322 of the first detection coil 32 in a direction perpendicular to the substrate, $\Delta p_1$ can be calculated by the following formula (2).

Formula (2)

$$\Delta p_1 = L \frac{\tan^{-1}\left(\frac{V_{SP1}}{V_{CP1}}\right)}{2\pi} \qquad (2)$$

However, $V_{SP1}$ is a peak value of the induced voltage induced in the sine wave-shaped coil element 321 of the first detection coil 32. $V_{CP1}$ is a peak value of the induced voltage induced in the cosine wave-shaped coil element 322 of the first detection coil 32.

Likewise, when the second recessed portion 202 is overlapped on the sine wave-shaped coil element 331 and the cosine wave-shaped coil element 332 of the second detection coil 33 in a direction perpendicular to the substrate, $\Delta p_2$ can be calculated by the following formula (3).

Formula (3)

$$\Delta p_2 = L \frac{\tan^{-1}\left(\frac{V_{SP2}}{V_{CP2}}\right)}{2\pi} \qquad (3)$$

However, $V_{SP2}$ is a peak value of the induced voltage induced in the sine wave-shaped coil element 331 of the second detection coil 33. $V_{CP2}$ is a peak value of the induced voltage induced in the cosine wave-shaped coil element 332 of the second detection coil 33.

The calculation unit 5 can determine the position of the rack shaft 12 by calculation by the formula (2) or the formula (3). A moving distance of the rack shaft 12 in the x-axis direction over which the calculation unit 5 can determine the position of the rack shaft 12 by the formula (2), and a moving distance of the rack shaft 12 in the x-axis direction over which the calculation unit 5 can determine the absolute position of the rack shaft 12 by the formula (3) are (1−u)L respectively. Therefore, in the present embodiment, the overall moving distance of the rack shaft 12 over which the calculation unit 5 can determine the position of the rack shaft 12 is 2(1−u)L.

The moving distance 2(1−u)L is longer than the moving distance (1−u)L of the rack shaft 12 over which the position of the rack shaft 12 can be determined in the first embodiment. In other words, in the second embodiment, a detectable length over which the position of the rack shaft 12 can be detected with respect to the length L of the first detection coil 32 and the second detection coil 33 is longer than that in the first embodiment. That is, the length of the first detection coil 32 and the second detection coil 33 L is short with respect to the length over which the position of the rack shaft 12 can be detected.

Therefore, in the second embodiment, the length of the substrate 3A can be shortened and the installation area can be smaller than that in the first embodiment.

Third Embodiment

Figure 12:
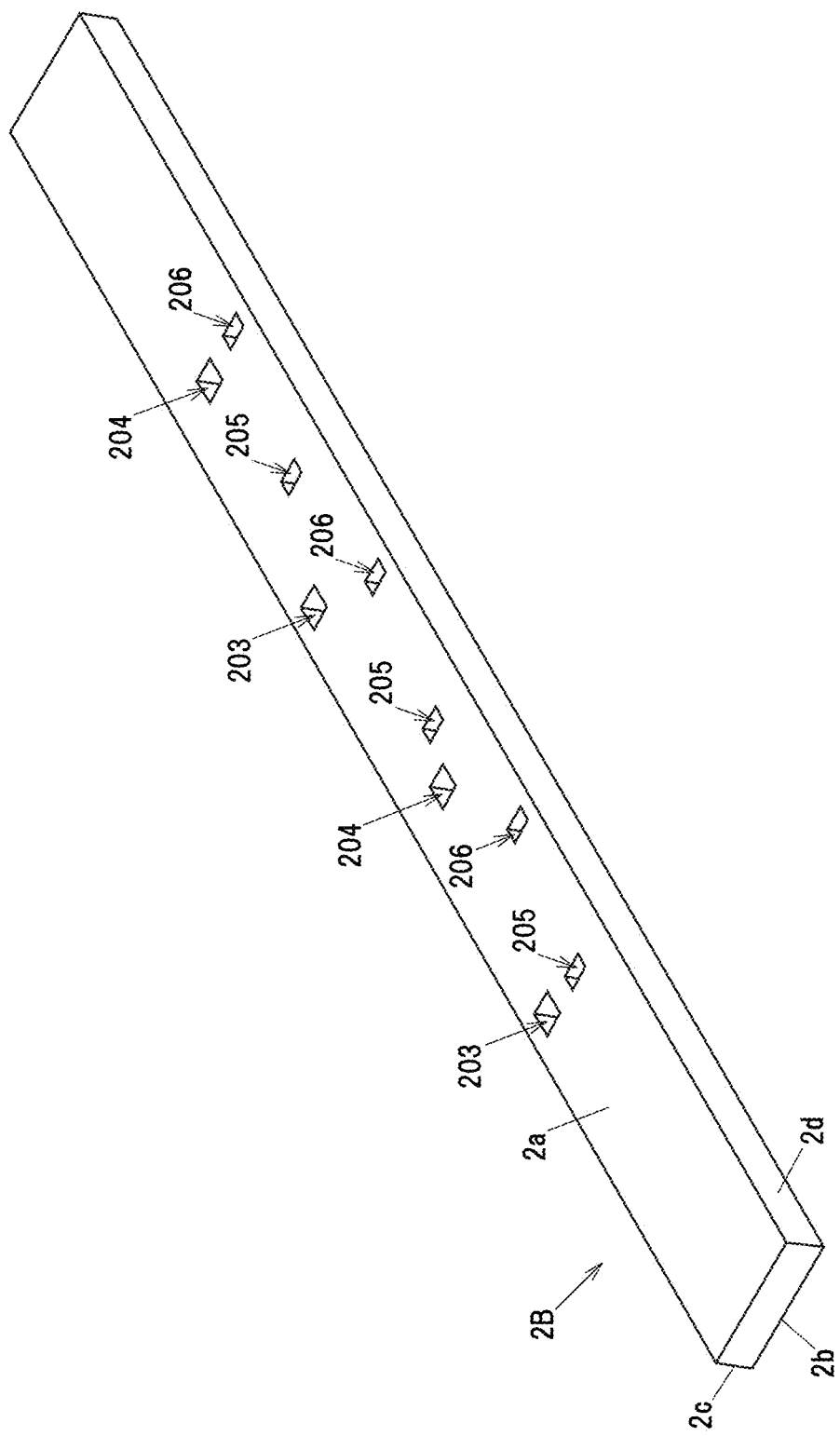
FIG. 12 is a perspective view showing a detection target according to the third embodiment.
Figure 13:
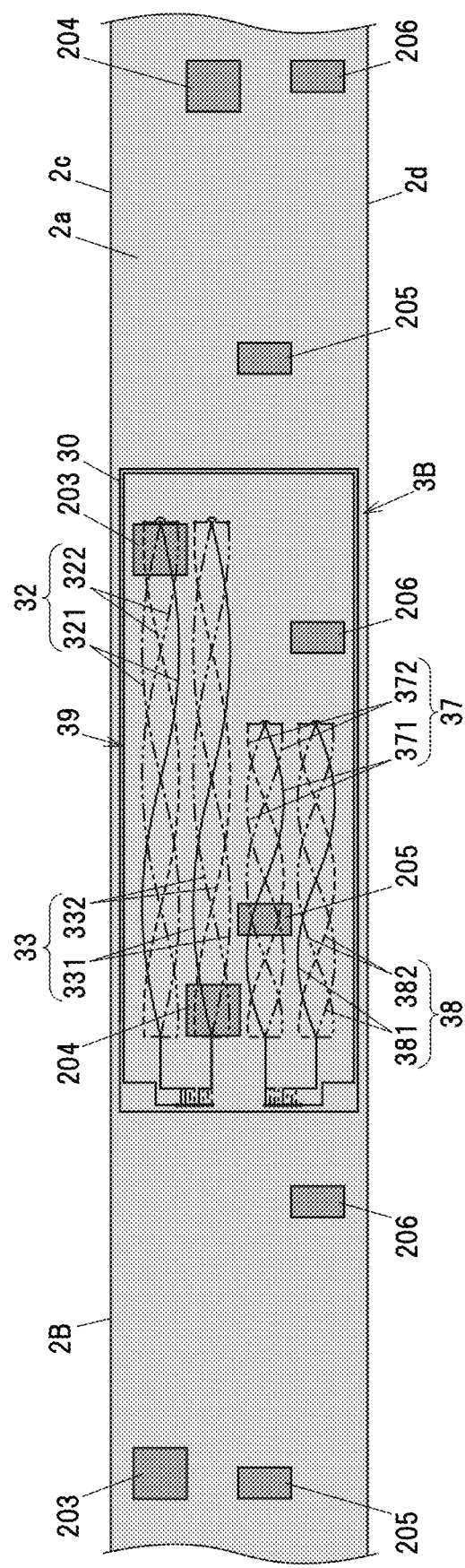
FIG. 13 is an explanatory diagram showing the substrate and the detection target according to the third embodiment, overlapped in a direction perpendicular to the substrate.

Next, the third embodiment of the present invention will be described with reference to FIGS. 12 and 13. FIG. 12 is a perspective view showing a detection target 2B according to the third embodiment. FIG. 13 is an explanatory diagram illustrating the substrate 3B and the detection target 2B according to the third embodiment, overlapped in a direction perpendicular to the substrate. The detection target 2B is, as in the second embodiment, a rectangular flat plate having long side portions in the axial direction of the rack shaft 12, and can be mounted onto the flat surface 122 of the rack shaft 12, e.g., by welding.

The first and second detection coils 32 and 33, the third and fourth detection coils 37 and 38, and an exciting coil 39 are formed on the substrate 3B. The substrate 3B is a four-layered substrate, as in the first and second embodiments, in which the first and second detection coils 32 and 33, the third and fourth detection coils 37 and 38, and the exciting coil 39 are formed in each layer separately.

The configuration of the first and second detection coils 32 and 33 is the same as that in the second embodiment. The third and fourth detection coils 37 and 38 have sine wave-shaped coil elements 371 and 381 and cosine wave-shaped coil elements 372 and 382 respectively, but they are shorter than the sine wave-shaped coil element 321 and 331 and the cosine wave-shaped coil element 322 and 332 of the first and second detection coils 32 and 33 in the axial direction of the rack shaft 12.

The exciting coil 39 is formed to surround the first and second detection coils 32 and 33 and the third and fourth detection coils 37 and 38 collectively, and is connected to the power supply unit 4 via the connector 6 and the cable 7. The first and second detection coils 32 and 33 and the third and fourth detection coils 37 and 38 are connected to the calculation unit 5 via the connector 6 and the cable 7.

On the detection target 2B, a plurality of the first recessed portions 203 corresponding to the first detection coil 32, a plurality of the second recessed portions 204 corresponding to the second detection coil 33, a plurality of the third recessed portions 205 corresponding to the third detection coil 37, and a plurality of the fourth recessed portions 206 corresponding to the fourth detection coil 38 are formed respectively in the axial direction of the rack shaft 12. The plurality of the first recessed portions 203, the second recessed portions 204, the third recessed portions 205, and the fourth recessed portions 206 are formed penetrating the detection target 2B in the plate thickness direction.

The plurality of the first recessed portions 203 are spaced apart at a predetermined interval in the longitudinal direction of the detection target 2B. The plurality of the second recessed portions 204 are spaced apart at the same predetermined interval as that of the plurality of the first recessed portions 203 in the longitudinal direction of the detection target 2B. The plurality of the third recessed portions 205 are spaced apart at a predetermined interval narrower than that of the plurality of the first recessed portions 203 in the longitudinal direction of the detection target 2B. The plurality of the fourth recessed portions 206 are spaced apart at the same predetermined interval as that of the plurality of the third recessed portions 205 in the longitudinal direction of the detection target 2B.

While the rack shaft 12 is moving from one end to the other end in the axial direction, the first detection coil 32 and the plurality of the first recessed portions 203 face each other in perpendicular direction to the substrate, the second detection coil 33 and the plurality of the second recessed portions 204 face each other in perpendicular direction to the substrate. Likewise, while the rack shaft 12 is moving from one end to the other end in the axial direction, the third detection coil 37 and the plurality of the third the recessed portions 205 face each other in perpendicular direction to the substrate, the fourth detection coils 38 and the plurality of the fourth recessed portions 206 face each other in perpendicular direction to the substrate.

The detectable range of the positions of the plurality of the first recessed portions 203 by the first detection coil 32 and the detectable range of the positions of the plurality of the second recessed portions 204 by the detection coil 33 are in series in the movement direction of the rack shaft 12, partially overlapped. Likewise, the detectable range of the positions of the plurality of the third recessed portions 205 by the third detection coil 37 and the detectable range of the positions of the plurality of the fourth recessed portions 206 by the fourth detection coil 38 are in series in the movement direction of the rack shaft 12, partially overlapped.

When the rack shaft 12 moves in one direction, a distance the rack shaft 12 moves while the peak value of the voltage induced in the first and second detection coils 32 and 33 changes by one cycle and a distance the rack shaft 12 moves while the peak value of the voltage induced in the third and fourth detection coils 37 and 38 changes by one cycle are different from each other. In the present embodiment corresponding to the difference between the length of the first and second detection coils 32 and 33 in the axial direction of the rack shaft 12 and the length of the third and fourth detection coils 37 and 38 in the axial direction of the rack shaft 12, a distance the rack shaft 12 moves, while the peak value of the voltage induced in the third and fourth detection coils 37 and 38 changes by one cycle, is shorter than a distance the rack shaft 12 moves, while the peak value of the voltage induced in the first and second detection coils 32 and 33 changes by one cycle.

When the distance the rack shaft 12 moves while the peak value of the voltage induced in the first and second detection coils 32 and 33 changes by one cycle is $X_{12}$ and the distance the rack shaft 12 moves while the peak value of the voltage induced in the third and fourth detection coils 37 and 38 changes by one cycle is $X_{34}$, $X_{34}$ is longer than a half of $X_{12}$ and $X_{12}$ is a non-integer multiple of $X_{34}$. Therefore, the calculation unit 5 can determine by calculation an absolute position of the rack shaft 12 in a longer distance than the second embodiment by comparing the position of the first recessed portion 203 or the second recessed portion 204 figured out by an output signal from the first detection coil 32 or the second detection coil 33 and the position of the third recessed portion 205 or the fourth recessed portion 206 figured out by an output signal from the third detection coil 37 or the fourth detection coil 38. Also, when the length of the stroke range of the rack shaft 12 is equal to that of the second embodiment, the length in the longitudinal direction of the substrate 3B can be shorter than the length in the longitudinal direction of the substrate 3A according to the second embodiment.

Fourth Embodiment

Figure 14:
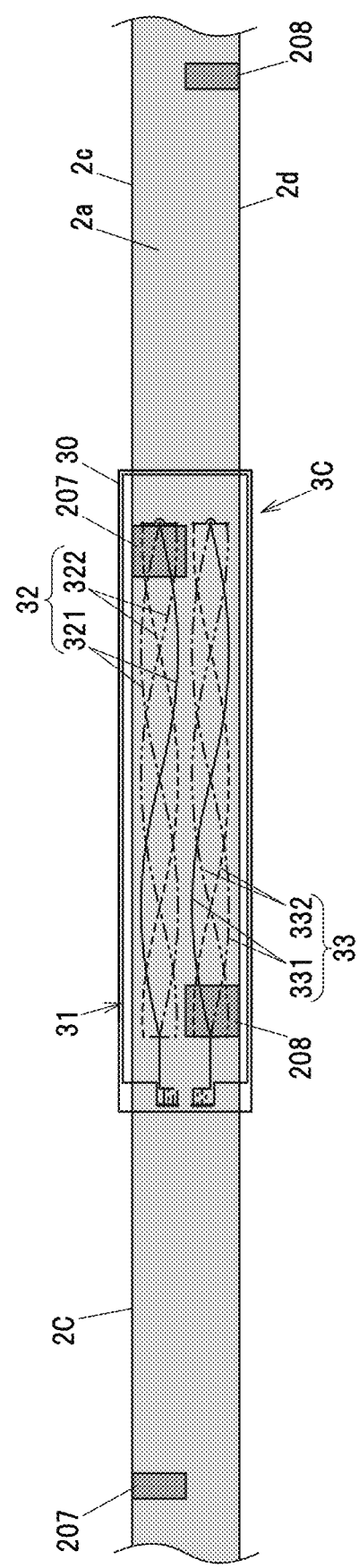
FIG. 14 is an explanatory diagram showing the substrate and the detection target according to the fourth embodiment, overlapped in a direction perpendicular to the substrate.

Next, the fourth embodiment of the present invention will be explained with reference to FIG. 14. FIG. 14 is an explanatory diagram illustrating a substrate 3C and a detection target 2C according to the fourth embodiment, overlapped in a direction perpendicular to the substrate. The substrate 3C is configured in the same manner as the substrate 3A according to the second embodiment. The detection target 2C is a rectangular flat plate having long side portions in the axial direction of the rack shaft 12, as in the second embodiment, and can be mounted onto the flat surface 122 of the rack shaft 12, e.g., by welding.

On the detection target 2C, the plurality of the first recessed portions 207 corresponding to the first detection coil 32 are formed apart in the axial direction of the rack shaft 12, and likewise, the plurality of the second recessed portions 208 corresponding to the second detection coil 33 are formed apart in the axial direction of the rack shaft 12. The plurality of the first recessed portions 207 and the second recessed portion 208 are formed penetrating the detection target 2C in the direction of plate thickness. The plurality of the first recessed portions 207 are open toward the side surface 2c of the detection target 2C, and the plurality of the second recessed portions 208 are open toward the side surface 2d of the other side of the detection target 2C.

The detectable range of the position of the first recessed portion 207 by the first detection coil 32 and the detectable range of the position of the second recessed portion 208 by the second detection coil 33 are in series in the movement direction of the rack shaft 12, partially overlapped. While the rack shaft 12 is moving from one end to the other, the plurality of the first recessed portions 207 face the first detection coil 32, the plurality of the second recessed portions 208 face the second detection coil 33.

The plurality of the first recessed portions 207 are different from each other in length in the axial direction of the rack shaft 12. Likewise, the plurality of the second recessed portions 208 are different from each other in length in the axial direction of the rack shaft 12.

The strength of the induced voltage induced in the first detection coil 32 differs according to the length of the first recessed portion 207, and the strength of the induced voltage induced in the second detection coil 33 differs according to the length of the second recessed portion 208. Thus, the calculation unit 5 can determine, according to the strength of induced voltage, which one of the plurality of the first recessed portions 207 faces the first detection coil 32, and which one of the plurality of the second recessed portion 208 faces the second detection coil 33. Therefore, the calculation unit 5 can determine by calculation an absolute position of the rack shaft 12 in a longer distance than in the second embodiment. Also, when the length of the stroke range of the rack shaft 12 is equal to that of the second embodiment, the length in the longitudinal direction of the substrate 3B can be shorter than the length in the longitudinal direction of the substrate 3A according to the second embodiment.

Summary of the Embodiments

Technical ideas understood from the embodiments will be described below citing the reference signs, etc., used for the embodiments. However, each reference sign, etc., described below is not intended to limit the constituent elements in the claims to the members, etc., specifically described in the embodiments.

According to the first feature, a position detection device (stroke sensor) 10 configured to detect a position of a moving member (rack shaft) 12 moving backward and forward in a predetermined moving direction includes a conductive detection member (detection target) 2, 2A, 2B, 2C attached to the moving member 12; and an exciting coil 31, 39 and a detection coil 32, 33, 37, 38 that are arranged extending in the moving direction of the moving member 12 and facing the conductive detection member 2, 2A, 2B, 2C, wherein the conductive detection member 2, 2A, 2B, 2C includes a recessed portion 20, 203 to 208 recessed in a direction away from the exciting coil 31, 39 and the detection coil 32, 33, 37, 38, wherein a voltage is induced in the detection coil 32, 33, 37, 38 by a current flowing in the conductive detection member 2, 2A, 2B, 2C due to a magnetic field generated by the exciting coil 31, 39, and wherein a magnitude of the voltage induced in the detection coil 32, 33, 37, 38 varies with a position of the recessed portion 20, 203 to 208 relative to the detection coil 32, 33, 37, 38.

According to the second feature, in the position detection device 10 as described in the first feature, the exciting coil 31, 39 and the detection coil 32, 33, 37, 38 are formed on a single substrate 3, 3A, 3B, 3C, and wherein the conductive detection member 2, 2A, 2B, 2C includes a facing surface 2a facing the substrate 3, 3A, 3B, 3C through an air gap G of a predetermined width, the facing surface 2a is a plane parallel to the substrate 3, 3A, 3B, 3C, and the recessed portion 20, 203 to 208 is recessed in a direction perpendicular to the facing surface 2a.

According to the third feature, in the position detection device 10 as described in the first feature, the detection coil 32, 33, 37, 38 includes a pair of coil elements (sine-wave shaped coil element and cosine-wave shaped coil element) 321, 331, 371, 381; 322, 332, 372, 382 whose output voltage changes according to the position of the moving member 12, and a phase of the output voltage of each of the pair of coil elements 321, 331, 371, 381; 322, 332, 372, 382 during movement of the moving member 12 is different from each other.

According to the fourth feature, in the position detection device 10 as described in the third feature, each of the pair of coil elements 321, 331, 371, 381; 322, 332, 372, 382 comprises a combination of two sinusoidal-shaped conductor wires 301a, 301f, 302a, 302e, 303a, 303e, 304a, 304e symmetrical across a symmetry axis line $C_1$, $C_2$, $C_3$ parallel to the moving direction, and the output voltage varies according to the position of the moving member 12 by a difference between a strength of the magnetic field in a portion facing the recessed portion 20, 203 to 208 and a strength of the magnetic field in a portion not facing the recessed portion 20, 203 to 208.

According to the fifth feature, in the position detection device 10 as described in the first feature, the detection coil 32, 33, 37, 38 comprises a plurality of detection coils 32, 33, 37, 38 being aligned in a direction perpendicular to an extending direction of the exciting coil 31, 39, wherein the conductive detection member 2, 2A, 2B, 2C includes a plurality of the recessed portions 20, 203 to 208 corresponding to the plurality of detection coils 32, 33, 37, 38 respectively at different positions in the moving direction, and wherein a detectable range in which the position of the moving member 12 can be detected by each of the plurality of detection coils 32, 33, 37, 38 is offset in the moving direction of the moving member 12.

According to the sixth feature, in the position detection device 10 as described in the fifth feature, the plurality of the detection coils 32, 33, 37, 38 includes a first detection coil 32 and a second detection coil 33, and wherein a detectable range of the first detection coil 32 and a detectable range of the second detection coil 33 overlap in part and are continuous in the moving direction.

According to the seventh feature, in the position detection device 10 as described in the sixth feature, each of the first detection coil 32 and the second detection coil 33 faces the plurality of the recessed portions 203, 204, 207, 208 spaced apart in the moving direction while the moving member 12 moves from one moving end to an other moving end in the moving direction.

According to the eighth feature, in the position detection device 10 as described in the seventh feature, lengths in the moving direction of the plurality of the recessed portions 207 facing the first detection coil 32 are different from each other while the moving member 12 moves from the one moving end to the other moving end, and wherein lengths in the moving direction of the plurality of the recessed portions 208 facing the second detection coil 33 are different from each other while the moving member 12 moves from the one moving end to the other moving end.

According to the ninth feature, in the position detection device 10 as described in the first feature, the recessed portions 203 to 208 penetrate through the conductive detection member 2A, 2B, 2C in a direction away from the exciting coil 31, 39 and the detection coil 32, 33, 37, 38.

According to the tenth feature, a vehicle steering device includes a shaft 12 that moves axially forward and backward along a vehicle width direction; a housing 13 that houses the shaft 12; and a position detection device 10 that detects a position of the shaft 12 relative to the housing 13, wherein a wheel (steering wheel) 100 is steered by axial movement of the shaft 12, wherein the position detection device 10 includes a conductive detection member (detection target) 2, 2A, 2B, 2C attached to the shaft 12; and an exciting coil 31, 39 and a detection coil 32, 33, 37, 38 that are arranged extending in a moving direction of the shaft 12 and facing the conductive detection member 2, 2A, 2B, 2C, wherein the conductive detection member 2, 2A, 2B, 2C includes a recessed portion 20, 203 to 208 recessed in a direction away from the exciting coil 31, 39 and the detection coil 32, 33, 37, 38, wherein a voltage is induced in the detection coil 32, 33, 37, 38 by a current flowing in the conductive detection member 2, 2A, 2B, 2C due to a magnetic field generated by the exciting coil 31, 39, and wherein a magnitude of the voltage induced in the detection coil 32, 33, 37, 38 varies with a position of the recessed portion 20, 203 to 208 relative to the detection coil 32, 33, 37, 38.

The above description of the embodiment of the invention does not limit the invention as claimed above. It should also be noted that not all of the combinations of features described in the embodiment are essential for the invention to solve the problems of the invention.

The invention claimed is:

1. A position detection device configured to detect a position of a moving member moving backward and forward in a predetermined moving direction, comprising:
a conductive detection member attached to the moving member; and
an exciting coil and a detection coil that are arranged extending in the moving direction of the moving member and facing the conductive detection member,
wherein the conductive detection member includes a recessed portion recessed in a direction away from the exciting coil and the detection coil,
wherein a voltage is induced in the detection coil by a current flowing in the conductive detection member due to a magnetic field generated by the exciting coil, and wherein a magnitude of the voltage induced in the detection coil varies with a position of the recessed portion relative to the detection coil.

2. The position detection device, according to claim 1, wherein the exciting coil and the detection coil are formed on a single substrate, and wherein the conductive detection member includes a facing surface facing the substrate through an air gap of a predetermined width, the facing surface is a plane parallel to the substrate, and the recessed portion is recessed in a direction perpendicular to the facing surface.

3. The position detection device, according to claim 1, wherein the detection coil includes a pair of coil elements whose output voltage changes according to the position of the moving member, and a phase of the output voltage of each of the pair of coil elements during movement of the moving member is different from each other.

4. The position detection device, according to claim 3, wherein each of the pair of coil elements comprises a combination of two sinusoidal-shaped conductor wires symmetrical across a symmetry axis line parallel to the moving direction, and the output voltage varies according to the position of the moving member by a difference between a strength of the magnetic field in a portion facing the recessed portion and a strength of the magnetic field in a portion not facing the recessed portion.

5. The position detection device, according to claim 1, wherein the detection coil comprises a plurality of detection coils being aligned in a direction perpendicular to an extending direction of the exciting coil,
wherein the conductive detection member includes a plurality of the recessed portions corresponding to the plurality of detection coils respectively at different positions in the moving direction, and
wherein a detectable range in which the position of the moving member can be detected by each of the plurality of detection coils is offset in the moving direction of the moving member.

6. The position detection device, according to claim 5, wherein the plurality of the detection coils includes a first detection coil and a second detection coil, and
wherein a detectable range of the first detection coil and a detectable range of the second detection coil overlap in part and are continuous in the moving direction.

7. The position detection device, according to claim 6, wherein each of the first detection coil and the second detection coil faces the plurality of the recessed portions spaced apart in the moving direction while the moving member moves from one moving end to an other moving end in the moving direction.

8. The position detection device, according to claim 7, wherein lengths in the moving direction of the plurality of the recessed portions facing the first detection coil are different from each other while the moving member moves from the one moving end to the other moving end, and wherein lengths in the moving direction of the plurality of the recessed portions facing the second detection coil are different from each other while the moving member moves from the one moving end to the other moving end.

9. The position detection device, according to claim 5, wherein the recessed portions penetrate through the conductive detection member in a direction away from the exciting coil and the detection coil.

10. A vehicle steering device, comprising:
a shaft that moves axially forward and backward along a vehicle width direction;
a housing that houses the shaft; and
a position detection device that detects a position of the shaft relative to the housing,
wherein a wheel is steered by axial movement of the shaft,
wherein the position detection device comprises:
a conductive detection member attached to the shaft; and
an exciting coil and a detection coil that are arranged extending in a moving direction of the shaft and facing the conductive detection member,
wherein the conductive detection member includes a recessed portion recessed in a direction away from the exciting coil and the detection coil,
wherein a voltage is induced in the detection coil by a current flowing in the conductive detection member due to a magnetic field generated by the exciting coil,
and wherein a magnitude of the voltage induced in the detection coil varies with a position of the recessed portion relative to the detection coil.

* * * * *